(12) United States Patent
Takesada

(10) Patent No.: US 8,571,432 B2
(45) Date of Patent: Oct. 29, 2013

(54) IMAGE FORMING APPARATUS PROVIDED WITH FUNCTION TO CALCULATE CHARGE BASED ON THE NUMBER OF SHEETS PRINTED, PRINT SYSTEM INCLUDING IMAGE FORMING APPARATUS, METHOD FOR COUNTING THE NUMBER OF SHEETS PRINTED EXECUTED BY IMAGE FORMING APPARATUS, AND PROGRAM FOR COUNTING

(75) Inventor: Yoshikazu Takesada, Kawabe-gun (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1586 days.

(21) Appl. No.: 12/010,527

(22) Filed: Jan. 25, 2008

(65) Prior Publication Data

US 2008/0181651 A1    Jul. 31, 2008

(30) Foreign Application Priority Data

Jan. 30, 2007  (JP) .................................. 2007-19418
Jan. 30, 2007  (JP) .................................. 2007-19462

(51) Int. Cl.
*G03G 21/02* (2006.01)

(52) U.S. Cl.
USPC .......................................................... 399/79

(58) Field of Classification Search
USPC .......................................................... 399/79
See application file for complete search history.

(56) References Cited

U.S. PATENT DOCUMENTS 7,119,916 B2 * 10/2006 Kato et al. .................... 358/1.15
2001/0054152 A1   12/2001 Nakao et al.
2002/0140970 A1   10/2002 Kato et al.
2006/0044594 A1    3/2006 Shirai
2008/0162172 A1 *  7/2008 Iwaki et al. ........................ 705/1

FOREIGN PATENT DOCUMENTS

| JP | 8-249141 A    | 9/1996  |
| JP | 11-053140     | 2/1999  |
| JP | 2001-229004   | 8/2001  |
| JP | 2001-297045   | 10/2001 |
| JP | 2001-312774 A | 11/2001 |
| JP | 2002-283674   | 10/2002 |
| JP | 2003-108346   | 4/2003  |
| JP | 2004-145444 A | 5/2004  |

(Continued)

OTHER PUBLICATIONS

Machine translation of JP2004-213437.*
Notice of Ground of Rejection in JP 2007-019462 dated Feb. 17, 2009, and an English Translation thereof.

(Continued)

*Primary Examiner* — David Gray
*Assistant Examiner* — Andrew Do
(74) *Attorney, Agent, or Firm* — Buchanan Ingersoll & Rooney PC

(57) ABSTRACT

In order to properly count the number of sheets printed which serves as the basis on which a charge is calculated, an MFP that acts as a designated printer includes a job accepting portion to accept a print job, a job executing portion to carry out printing based on the print job, a requesting portion to, when the job executing portion is not available for executing the print job, transmit an alternative instruction including the print job to an alternative printer, and an adding portion to add the number of alternative sheets printed by the alternative printer based on the print job included in the alternative instruction to the number of sheets printed by the job executing portion.

18 Claims, 22 Drawing Sheets

(56) References Cited

FOREIGN PATENT DOCUMENTS

| | | |
|---|---|---|
| JP | 2004-213437 | 7/2004 |
| JP | 2006-065803 | 3/2006 |
| JP | 2006-155352 | 6/2006 |

OTHER PUBLICATIONS

Notice of Ground of Rejection in JP 2007-019418 dated Mar. 17, 2009, and an English Translation thereof.

* cited by examiner

F I G. 1 4
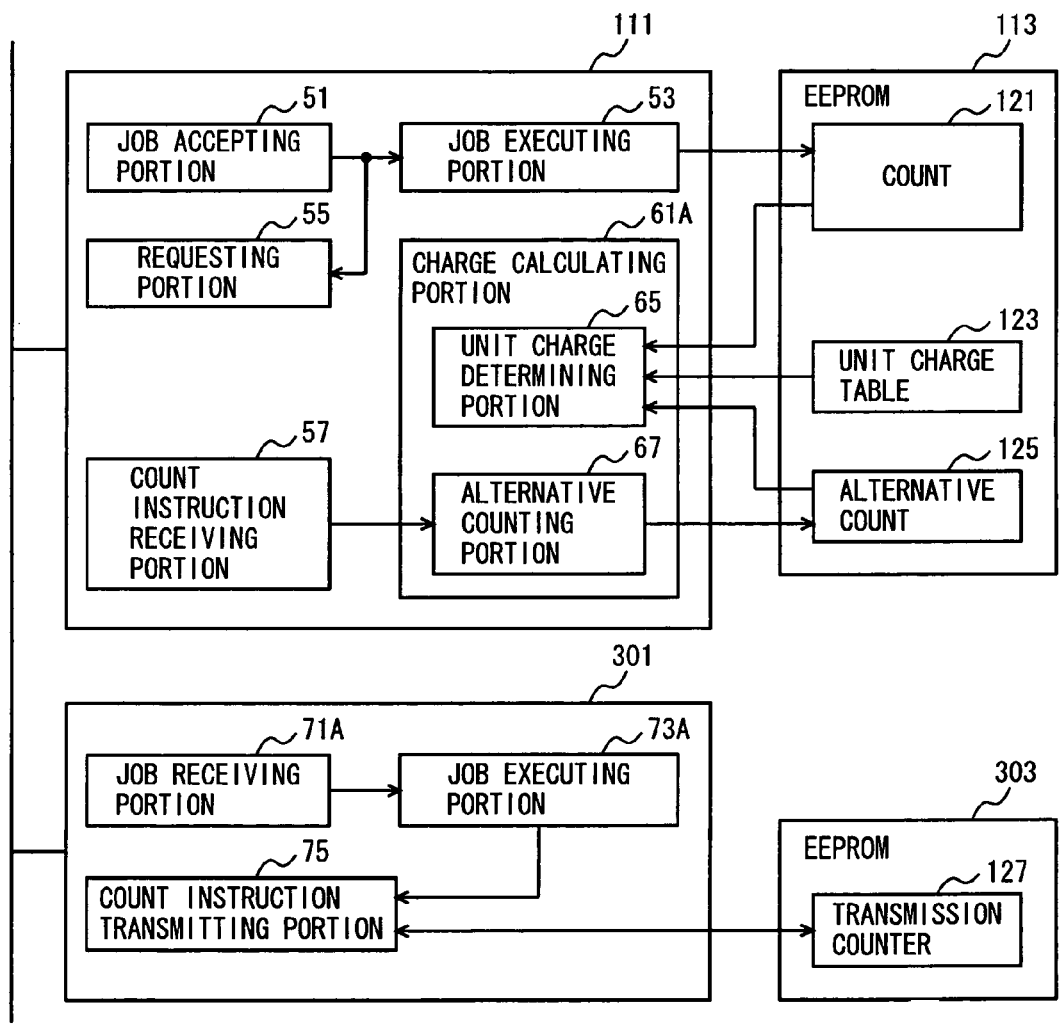

F I G. 1 7
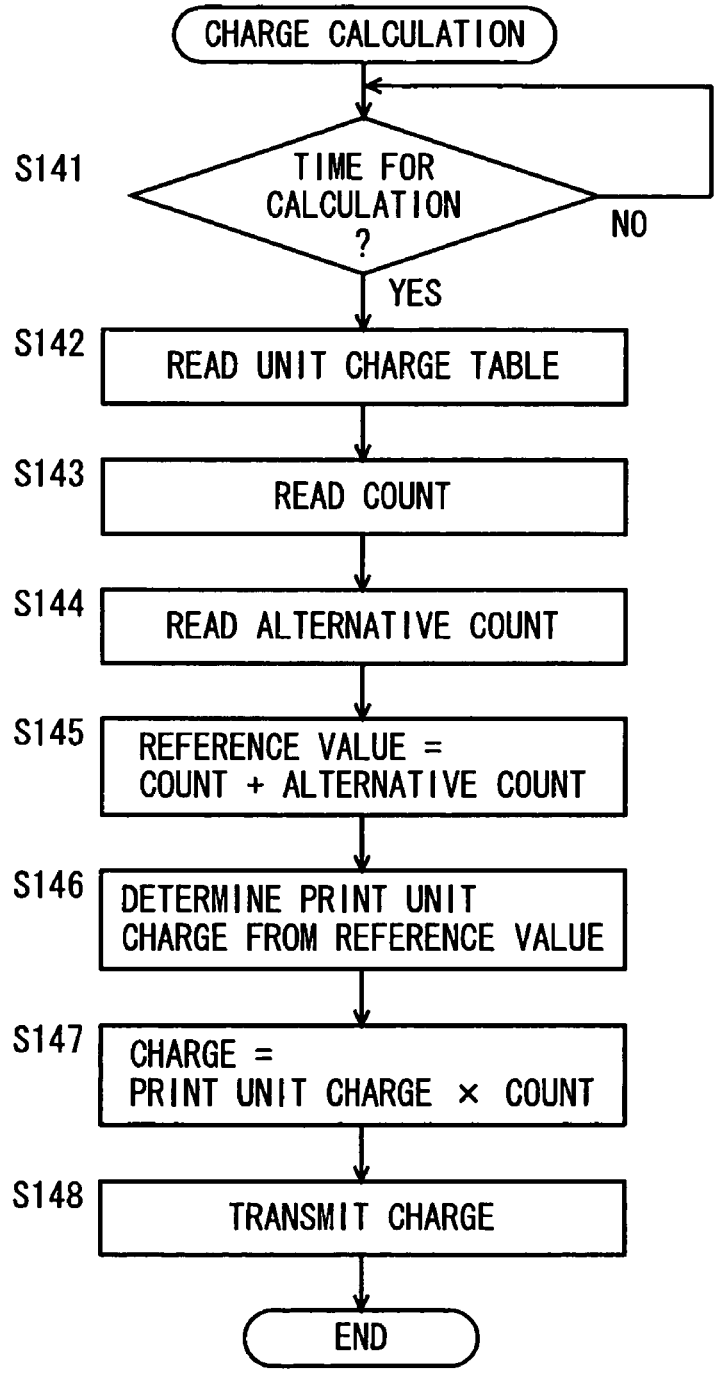

F I G. 2 4
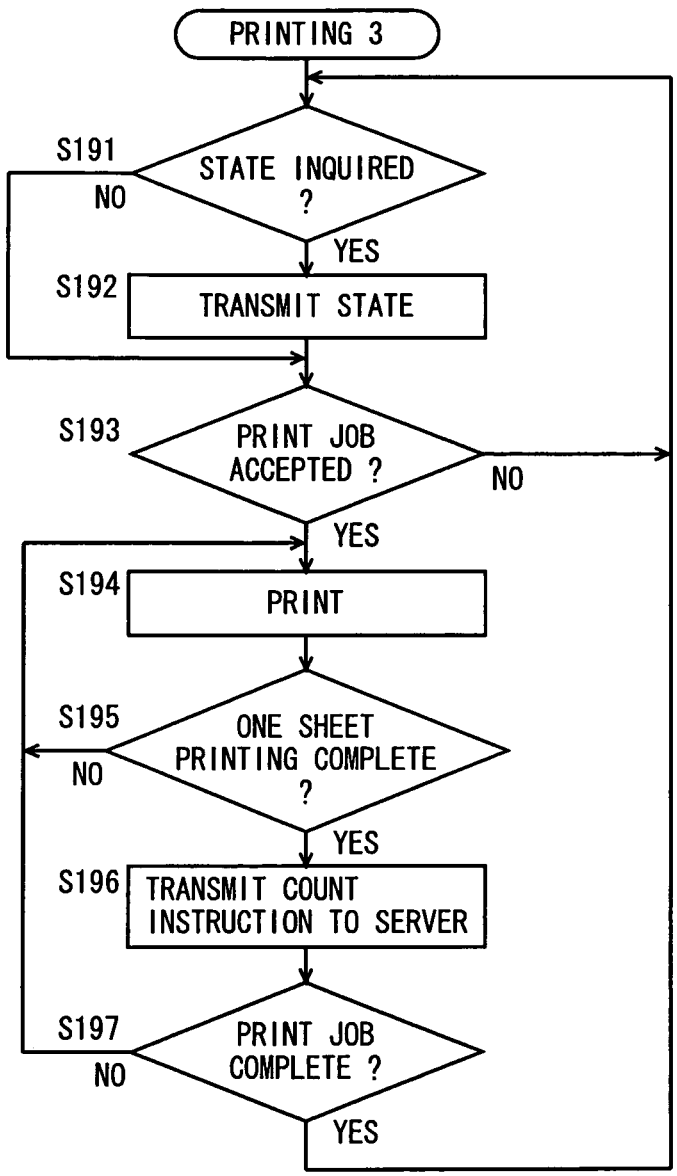

IMAGE FORMING APPARATUS PROVIDED WITH FUNCTION TO CALCULATE CHARGE BASED ON THE NUMBER OF SHEETS PRINTED, PRINT SYSTEM INCLUDING IMAGE FORMING APPARATUS, METHOD FOR COUNTING THE NUMBER OF SHEETS PRINTED EXECUTED BY IMAGE FORMING APPARATUS, AND PROGRAM FOR COUNTING

This application is based on Japanese Patent Application Nos. 2007-19418 and 2007-19462 filed with Japan Patent Office both on Jan. 30, 2007, the entire contents of which are hereby incorporated by reference.

BACKGROUND OF THE INVENTION

1. Field of the Invention

The present invention relates to an image forming apparatus, a print system, a method for counting the number of sheets printed, and a program for counting the number of sheets printed. More particularly, the invention relates to an image forming apparatus provided with a function to calculate a charge based on the number of sheets printed, a print system including the image forming apparatus, a method for counting the number of sheets printed executed by the image forming apparatus, and a program for counting the number of sheets printed executed by the image forming apparatus.

2. Description of the Related Art

Conventionally, a plurality of image forming apparatuses such as printers are occasionally connected to a network. When a personal computer (hereinafter referred to as "PC") connected to the network transmits print data to an image forming apparatus, the print data is printed on the image forming apparatus. A technique is being developed such that when the image forming apparatus receiving the print data cannot print the print data for reasons including failure, another image forming apparatus prints the print data Also, a charge is made for printing on some image forming apparatuses, which count the number of paper sheets printed which serves as the basis on which the charge is calculated. These image forming apparatuses occasionally employ a different unit charge, which is a price for printing on a single sheet. Even a single image forming apparatus may employ different unit charges depending on the number of sheets printed; for example, under the charging system where the unit charge becomes lower as the number of sheets printed increases, the unit charge varies depending on the number of sheets printed.

When the image forming apparatus receiving the print data from the PC cannot print the print data for reasons including failure and another image forming apparatus prints the print data instead, then the image forming apparatus that actually prints the print data may have a higher unit charge than that of the image forming apparatus designated by the user for the printing. In this case, if a charge is calculated on the actually printing image forming apparatus, the user may be charged a higher amount of money than the user expected.

Also when the image forming apparatus designated by the user for the printing cannot print the print data for reasons including failure and another image forming apparatus prints the print data instead, then there is no increase in the number of sheets printed on the image forming apparatus designated by the user. If the image forming apparatus designated by the user is under the charging system where the unit charge decreases as the number of sheets printed increases, there is no decrease in the unit charge on the designated apparatus because the number of sheets printed does not increase there even though having been designated by the user for the printing.

SUMMARY OF THE INVENTION

The present invention is made to solve the aforementioned problems. An object of the present invention is to provide an image forming apparatus capable of properly counting the number of sheets printed which serves as the basis on which a charge is calculated.

Another object of the present invention is to provide a print system capable of properly counting the number of sheets printed which serves as the basis on which a charge is calculated.

Another object of the present invention is to provide such a method for counting the number of sheets that is capable of properly counting the number of sheets printed which serves as the basis on which a charge is calculated.

Another object of the present invention is to provide such a program for counting the number of sheets that is capable of properly counting the number of sheets printed which serves as the basis on which a charge is calculated.

Another object of the present invention is to provide an image forming apparatus capable of calculating a proper charge.

Another object of the present invention is to provide a print system capable of calculating a proper charge.

Another object of the present invention is to provide such a method for counting the number of sheets that is capable of calculating a proper charge.

Another object of the present invention is to provide such a program for counting the number of sheets that is capable of calculating a proper charge.

In order to achieve the aforementioned objects, according to an aspect of the present invention, an image forming apparatus includes: a job accepting portion to accept a print job; a printing portion to carry out printing based on the accepted print job; a requesting portion to, when the printing portion is not available for executing the accepted print job, transmit an alternative instruction including the accepted print job to an alternative printer; and an adding portion to add the number of alternative sheets to the number of sheets printed by the printing portion, the alternative sheets being printed by the alternative printer based on the print job included in the alternative instruction.

According to another aspect of the present invention, an image forming apparatus includes: a printing portion to, upon receipt of print job, carry out printing based on the print job; a count instruction transmitting portion to, when the image forming apparatus receives from another image forming apparatus an alternative instruction including the print job, transmit a count instruction to the other image forming apparatus, upon every printing based on the other print job included the alternative instruction; and a counting portion to, when the count instruction is not transmitted, count the number of sheets printed by the printing portion.

According to another aspect of the present invention, a print system includes: a print server, a first image forming apparatus, and a second image forming apparatus each carrying out printing upon receipt of a print job from the print server. The print server includes: a state detecting portion to detect a state of each of the first image forming apparatus and the second image forming apparatus; a job receiving portion to receive the print job; a state judging portion to, when the received print job designates the first image forming apparatus, judge whether the first image forming apparatus is available for printing; a first instructing portion to, when the state judging portion judges that the first image forming apparatus is available for printing, transmit the print job to the first image forming apparatus; and a second instructing portion to, when the state judging portion judges that the first image forming apparatus is not available for printing, transmit an alternative instruction including the print job to the second image forming apparatus. The first image forming apparatus includes: a first printing potion to carry out printing based on the print job upon receipt of the print job from the print server; and an adding portion to add the number of alternative sheets to the number of sheets printed by the first printing portion, the alternative sheets being printed by the second image forming apparatus based on the print job included in the alternative instruction.

According to another aspect of the present invention, a method for counting the number of sheets printed includes steps of: receiving a print job; carrying out printing based on the print job; transmitting an alternative instruction including the accepted print job to an alternative printer when the accepted print job is not executable in the printing step; and adding the number of alternative sheets to the number of sheets printed in the printing step, the alternative sheets being printed by the alternative printer based on the print job included in the alternative instruction.

According to another aspect of the present invention, a method for counting the number of sheets printed includes steps of: receiving a print job and carrying out printing based on the print job upon receipt of the print job; receiving from an image forming apparatus an alternative instruction including a print job and transmitting a count instruction to the image forming apparatus upon every printing based on the print job included the alternative instruction; and counting the number of sheets printed in the printing step when the count instruction is not transmitted.

According to another aspect of the present invention, a program that is for counting the number of sheets printed and that is embodied on a computer readable medium causes a computer to execute steps including: accepting a print job; carrying out printing based on the print job; transmitting an alternative instruction including the accepted print job to an alternative printer when the accepted print job is not executable in the printing step; and adding the number of alternative sheets to the number of sheets printed in the printing step, the alternative sheets being printed by the alternative printer based on the print job included in the alternative instruction.

According to another aspect of the present invention, a program that is for counting the number of sheets printed and that is embodied on a computer readable medium causes a computer to execute steps including: receiving a print job and carrying out printing based on the print job upon receipt of the print job; receiving from an image forming apparatus an alternative instruction including a print job and transmitting a count instruction to the image forming apparatus upon every printing based on the print job included the alternative instruction; and counting the number of sheets printed in the printing step when the count instruction is not transmitted.

According to another aspect of the present invention, an image forming apparatus includes: a job accepting portion to accept a print job; a printing portion to carry out printing based on the print job; a requesting portion to, when the printing portion is not available for executing the print job, transmit an alternative instruction including the accepted print job to an alternative printer; a counting portion to count the number of sheets printed by the printing portion; and an alternative counting portion to count the number of alternative sheets, the alternative sheets being printed by the alternative printer based on the print job included in the alternative instruction.

According to another aspect of the invention, a print system includes a print server, a first image forming apparatus, and a second image forming apparatus that carry out printing upon receipt of a print job from the print server. The print server includes: a state detecting portion to detect a state of each of the first image forming apparatus and the second image forming apparatus; a job receiving portion to receive the print job; a state judging portion to, when the received print job designates the first image forming apparatus, judge whether the first image forming apparatus is available for printing; a first instructing portion to, when the state judging portion judges that the first image forming apparatus is available for printing, transmit the print job to the first image forming apparatus; and a second instructing portion to, when the state judging portion judges that the first image forming apparatus is not available for printing, transmit an alternative instruction including the print job to the second image forming apparatus. The first image forming apparatus includes: a first printing potion to carry out printing based on the print job upon receipt of the print job from the print server; a counting portion to count the number of sheets printed by the first printing portion; and an alternative counting portion to count the number of alternative sheets, the alternative sheets being printed by the second image forming apparatus based on the print job included in the alternative instruction.

According to another aspect of the invention, a method for counting the number of sheets printed includes steps of: accepting a print job; carrying out printing based on the print job; transmitting an alternative instruction including the accepted print job to an alternative printer when the accepted print job is not executable in the printing step; counting the number of sheets printed in the printing step; and counting the number of alternative sheets, the alternative sheets being printed by the alternative printer based on the print job included in the alternative instruction.

According to another aspect of the present invention, a program that is for counting the number of sheets printed and that is embodied on a computer readable medium causes a computer to execute steps including: accepting a print job; carrying out printing based on the print job; transmitting an alternative instruction including the accepted print job to an alternative printer when the accepted print job is not executable in the printing step; counting the number of sheets printed in the printing step; and counting the number of alternative sheets, the alternative sheets being printed by the alternative printer based on the print job included in the alternative instruction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a functional block diagram schematically showing the functions of a print system according to a third embodiment.

FIG. 17 is a flowchart showing an example of the flow of a charge calculating process according to the third embodiment.

FIG. 24 is a flowchart showing an example of a print process executed by an alternative printer according to the fourth embodiment.

DESCRIPTION OF THE PREFERRED EMBODIMENTS

Figure 1:
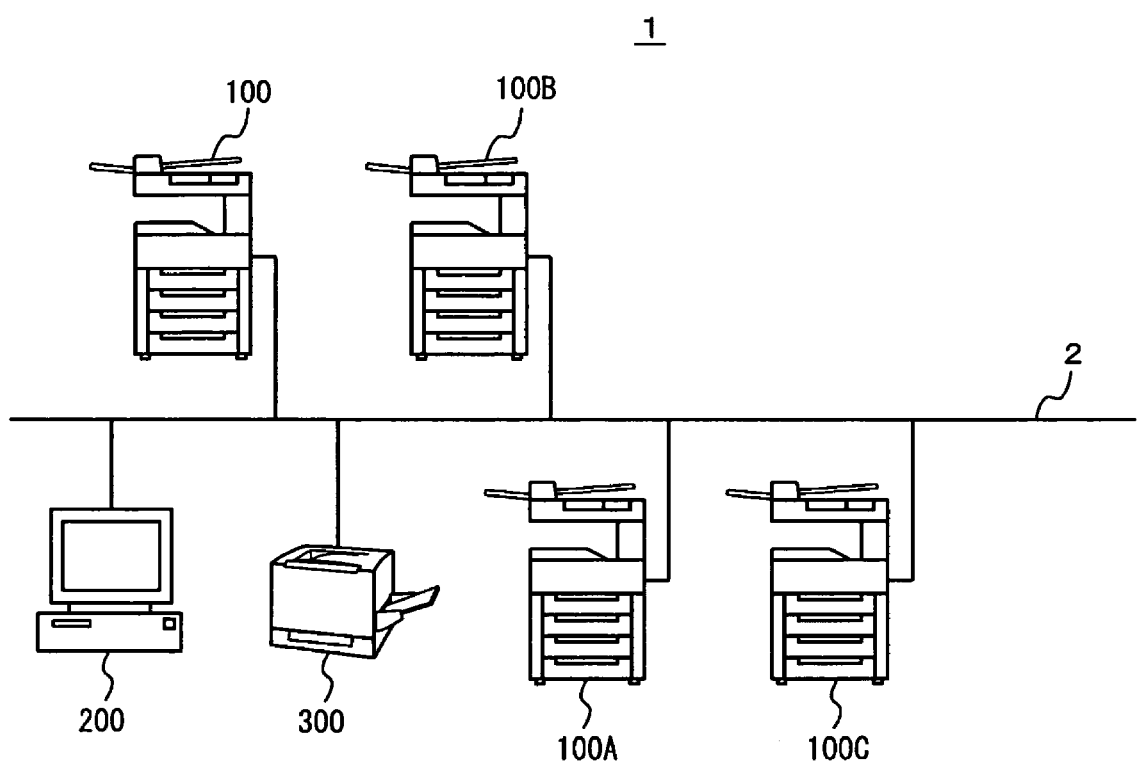
FIG. 1 is a schematic diagram of a print system according to a first embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 is a schematic diagram of a print system according to a first embodiment of the present invention. Referring to FIG. 1, a print system 1 includes multi-function peripherals (hereinafter referred to as MFPs) 100, 100A, 100B, and 100C, a PC 200, and a printer 300 each connected to a network 2. PC 200 is a usual computer with a known structure and functions, and therefore description of PC 200 will not be repeated.

MFPs 100, 100A, 100B, and 100C are image forming apparatuses against which an amount of money is charged for printing, while printer 300 is an image forming apparatus against which an amount of money is not charged for printing. MFPs 100, 100A, 100B, and 100C have the same structures and functions, and therefore MFP 100 will be taken as an example here unless stated otherwise.

Network 2 is a local area network (LAN), and the connection can be either by wire or radio. Also, network 2 is not limited to a LAN and can be a wide area network (WAN), the Internet, the public switched telephone network, or the like.

In print system 1 according to this embodiment, MFPs 100A, 100B, 100C, and printer 300 constitute a group. Each of MFPs 100A, 100B, 100C, and printer 300 stores therein apparatus identification information on one of the others as an apparatus that executes a print job in place of the each apparatus. The apparatus identification information is location information on network 2 allotted to each apparatus, examples including an IP (Internet Protocol) address and a MAC (Media Access Control) address.

Figure 2:
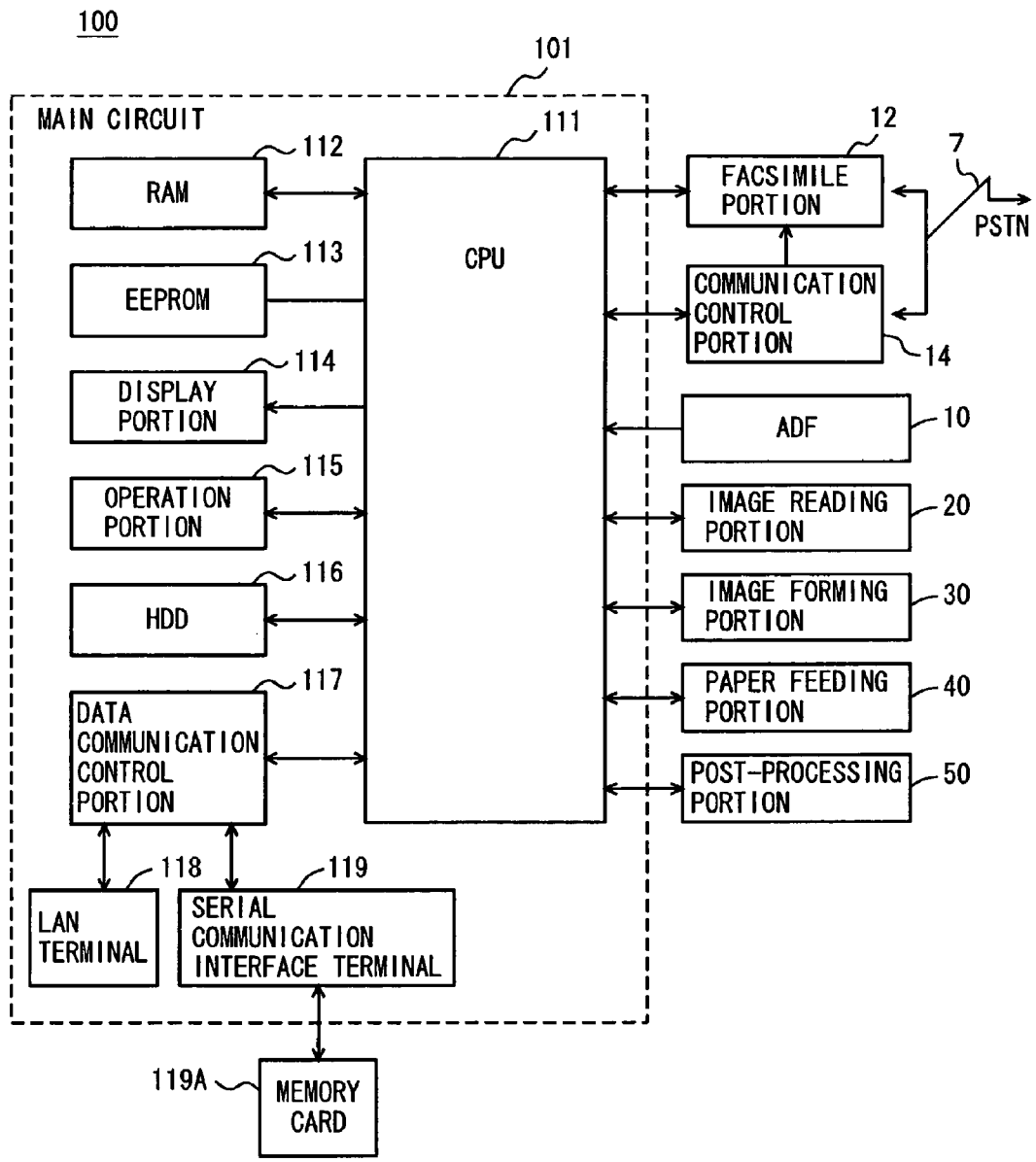
FIG. 2 is a diagram showing the hardware structure of an MFP according to the first embodiment.

FIG. 2 is a diagram showing the hardware structure of MFP 100 according to this embodiment. MFPs 100A, 100B, and 100C have the same hardware structure as MFP 100, and therefore description of the hardware structure of the MFPs will not be repeated. Referring to FIG. 2, MFP 100 includes a main circuit 101, a facsimile portion 12, a communication control portion 14, an ADF 10, an image reading portion 20, an image forming portion 30, a paper feeding portion 40, and a post-processing portion 50.

Main circuit 101 includes a central processing unit (CPU) 111, a RAM (Random Access Memory) 112 used as a working area for CPU 111, an EEPROM (Electronically Erasable Programmable Read Only Memory) 113 that stores a program or the like to be executed at CPU 111, a display portion 114, an operation portion 115, a hard disk drive (HDD) 116 as a mass storage, and a data communication control portion 117.

CPU 111 is connected to display portion 114, operation portion 115, HDD 116, and data communication control portion 117, and controls the entire main circuit 101. CPU 111 is connected to facsimile portion 12, communication control portion 14, ADF 10, image reading portion 20, image forming portion 30, paper feeding portion 40, and post-processing portion 50, and controls the entire MFP 100.

ADF 10 handles a plurality of sheets of document placed on a document tray and conveys the sheets in a one-by-one manner to image reading portion 20. Image reading portion 20 acquires image data by optically reading image information such as photograph, words, and picture from the document.

Image forming apparatus 30, upon input of image data therein, forms an image onto a sheet of paper based on the image data. Image forming apparatus 30 uses four toners, cyan, magenta, yellow, and black, which enables full color printing. Monochrome printing is also possible, with the use of one toner. Paper feeding portion 40 stores therein sheets of paper, and supplies the stored sheets of paper in a one-by-one manner to image forming apparatus 30. Post-processing portion 50 has a plurality of discharge trays, which enables post-processing portion 50 to sort recorded sheets of paper at the time of discharge. Post-processing portion 50 is also provided with a hole punching processing portion and a stapler processing portion, which enables the post-processing portion 50 to subject discharged recorded sheets of paper to punching processing and stapler processing.

Display portion 114 is a display such as a liquid crystal display (LCD), an organic ELD (Electro-Luminescence Display), or the like, and displays an instruction menu for users, information about acquired information, and the like. Operation portion 115 has a plurality of keys and accepts users' input, which corresponds to the keys, of various instructions and data including characters and numbers. Operation portion 115 includes a touch panel provided on display portion 114. Display portion 114 and operation portion 115 constitute an operation panel.

Data communication control portion 117 includes a LAN terminal 118 that is an interface for communication according to a communication protocol such as TCP (Transmission Control Protocol) and FTP (File Transfer Protocol), and a serial communication interface terminal 119 for serial communication. According to instructions from CPU 111, data communication control portion 117 transmits and receives data to and from an external apparatus connected to the LAN terminal 118 or serial communication interface terminal 119.

When a LAN cable for connection to network 2 is connected to LAN terminal 118, data communication control portion 117 communicates with an electronic mail server via LAN terminal 118, which enables data communication control portion 117 to send an electronic mail to the electronic mail server.

CPU 111 controls data communication control portion 117 to read, from memory card 119A, an image monitoring program to be executed by CPU 111, and stores the read image monitoring program in RAM 112 and executes the program. Recording media that stores a program executed by CPU 111 is not limited to memory card 119A and can also be media that records a program in a fixed manner, such as a flexible disk, a cassette tape, an optical disk [CD-ROM (Compact Disc-Read Only Memory)/MO (Magnetic Optical Disc)/MD (Mini Disc)/DVD (Digital Versatile Disc)], an IC card (including a memory card), an optical card, and a semiconductor memory such as a masked ROM, an EPROM (Erasable Programmable ROM), an EEPROM (Electronically EPROM), and the like. It is also possible that CPU 111 downloads a program from a computer connected to the Internet and stores it in HDD 116, or that a computer connected to the Internet writes a program into HDD 116 so that the program stored in HDD 116 is loaded into RAM 112 and executed at CPU 111. The program, as used herein, not only includes a program directly executable by CPU 111, but also a source program, a compressed program, an encrypted program, and the like.

Communication control portion 14 is a modem for connecting CPU 111 to a PSTN (Public Switched Telephone Networks) 7. MFP 100 is assigned a telephone number in PSTN 7 in advance. When a facsimile connected to PSTN 7 makes a call to the telephone number assigned to MFP 100, then communication control portion 14 detects the call. Upon detecting the call, communication control portion 14 establishes a communication for facsimile portion 12.

Facsimile portion 12 is connected to PSTN 7, and transmits facsimile data to PSTN 7 or receives facsimile data from PSTN 7. Facsimile portion 12 converts the received facsimile data into print data printable by image forming apparatus 30 and outputs the print data to image forming apparatus 30. Then, image forming apparatus 30 prints the facsimile data received from facsimile portion 12 onto a sheet of paper. Facsimile portion 12 also converts data stored in HDD 116 into facsimile data and transmits the facsimile data to the facsimile connected to PSTN 7 or to another MFP. This enables it to output data stored in HDD 116 to the facsimile or to the other MFPs 100A, 100B, and 100C. Thus, MFP 100 is provided with the function of transmitting and receiving data by facsimile.

ADF 10, paper feeding portion 40, and post-processing portion 50, which convey paper, occasionally meet with errors including paper jamming. Also, an error may occur such that when paper feeding portion 40 runs out of paper stored therein, an image cannot be formed at image forming apparatus 30. Further, an error may occur when image forming apparatus 30, which contains expendables such as toner and transcription belt, uses the expendables to the extreme, where an image cannot be formed at image forming apparatus 30. There are troubles that occur when ADF 10, image reading portion 20, image forming portion 30, paper feeding portion 40, or post-processing portion 50 fails. MFP 100 is equipped with a sensor or counter for detecting an error or trouble; when the sensor or counter detects an error or trouble, image forming is discontinued.

The term error, as used herein, refers to a situation correctable by the MFP 100 user's replenishing the expendables or removing jammed paper. Examples of errors include using up of paper stored in paper feeding portion 40 and of the toner, using of the transcription belt to the extreme, and paper jamming through conveyance.

The term trouble, as used herein, refers to a situation not correctable by any measure by the user. Examples of troubles include failure of the photoreceptor drum of image forming portion 30, and disabled image reading at image reading portion 20.

Here a problematic situation correctable by the user will be assumed an error, while a problematic situation not correctable by the user will be assumed a trouble. It should be noted, however, that a distinction between an error and trouble can be arbitrarily determined; situations causing MFP 100 to discontinue operation of image forming may be classified into errors or troubles in advance.

CPU 111 can be activated independently of ADF 10, image reading portion 20, image forming portion 30, paper feeding portion 40, and post-processing portion 50. Thus, even when an error or trouble causes to discontinue operation of ADF 10, image reading portion 20, image forming portion 30, paper feeding portion 40, and post-processing portion 50, CPU 111 is able to communicate with PC 200 and the other MFPs 100A, 100B, and 100C via data communication control portion 117.

For simplicity of description, the case where PC 200 transmits a print job to MFP 100 when printing is impossible at MFP 100 because of a trouble will be exemplified. In this case, the print job transmitted from PC 200 is executed at MFP 100A, which is the alternative printer for MFP 100. MFP 100 is the apparatus designated for execution of the print job by the user through PC 200. The apparatus, such as MFP 100, that the user has designated for execution of the print data will be referred to as a designated printer. The apparatus, such as MFP 100A, that executes the print job in place of the designated printer will be referred to as an alternative printer.

Figure 3:
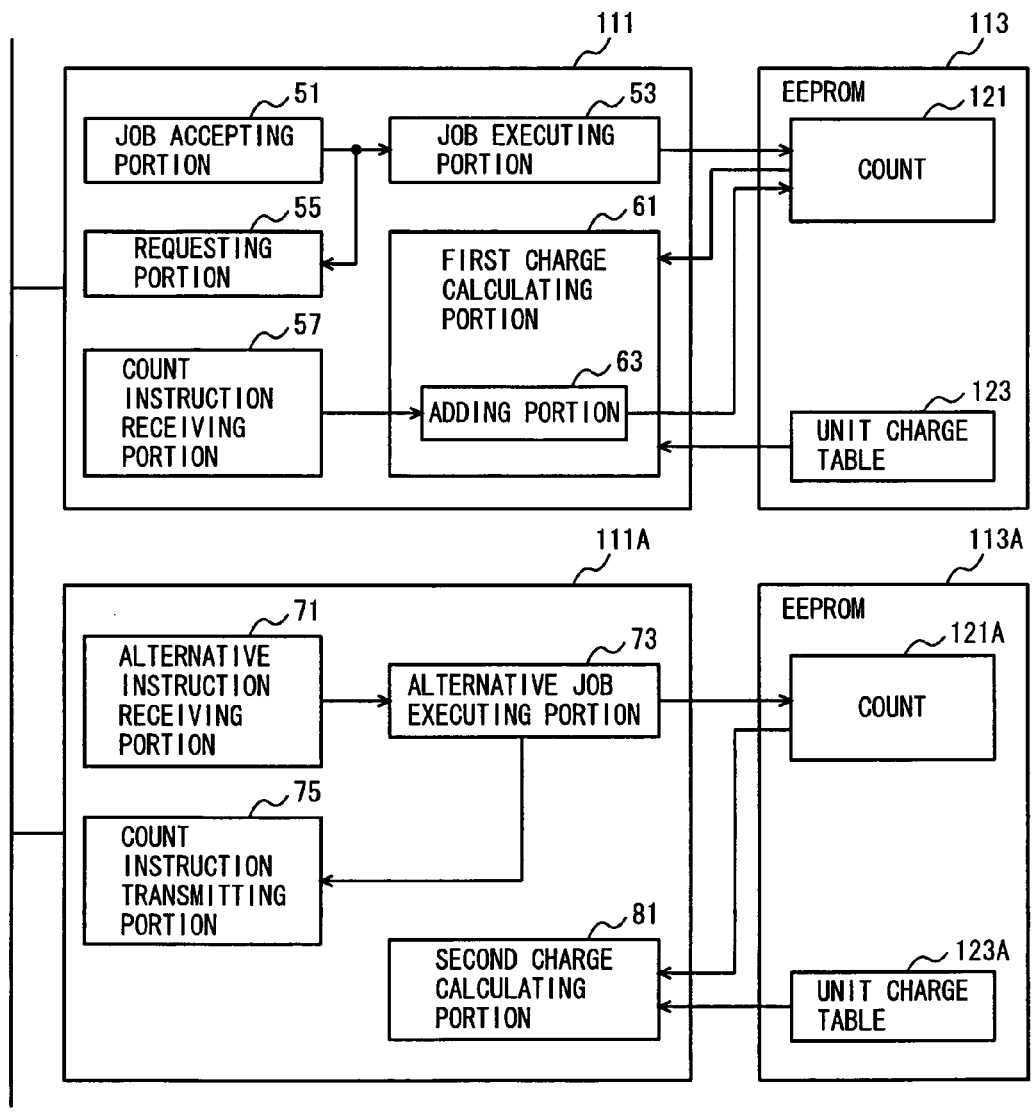
FIG. 3 is a functional block diagram schematically showing the functions of a print system according to the first embodiment.

FIG. 3 is a functional block diagram schematically showing the functions of the print system according to the first embodiment. FIG. 3 shows the functions of CPU 111 of MFP 100 acting as a designated printer and functions of CPU 111A of MFP 100A acting as an alternative printer. Also shown are an EEPROM 113 and an EEPROM 113A connected to MFP 100 and MFP 100A, respectively.

Referring to FIG. 3, CPU 111 of MFP 100, which is a designated printer, includes a job accepting portion 51 to accept a job, a job executing portion 53 to execute the job, a requesting portion 55 to make a request for execution of the job to the alternative printer, a count instruction receiving portion 57 to receive a count instruction from the alternative printer, and a first charge calculating portion 61 to calculate a charge.

Job accepting portion 51 accepts a print job transmitted from PC 200. When PC 200 transmits the print job to MFP 100, data communication control portion 117 receives the print job. It is the print job received by data communication control portion 117 that job accepting portion 51 accepts. Along with the print job, data communication control portion 117 receives apparatus identification information for identifying PC 200, and job accepting portion 51 accepts the apparatus identification information along with the print data. The apparatus identification information is location information of PC 200 on network 2. The apparatus identification information received along with the print data is transmitting source information for identifying the transmitting source of the print job. While description is made of receiving the transmitting source information and the print job as separate items, the print job may contain the transmitting source information. Job accepting portion 51 outputs the print job to job executing portion 53 and to requesting portion 55.

Job executing portion 53, upon input of the print job from job accepting portion 51, controls image forming apparatus 30 to have print data included in the print job printed according to print conditions. During causing image forming apparatus 30 to carry out printing based on the print job, job executing portion 53 updates a count 121 stored in a predetermined area of EEPROM 113 upon every printing of one sheet of paper by image forming apparatus 30. The update is carried out by adding "1", which denotes that the number of sheets printed is one, to the count 121. While description is made to providing a single area in EEPROM 113 for count 121, a plurality of count areas may be provided in EEPROM 113 each corresponding to a different unit charge that serves a basis on which a charge is levied. For example, there may be two count areas to correspond to full color printing and monochrome printing. While image forming apparatus 30 updates count 121 upon completion of printing of one sheet, the update may be carried out upon completion of the print job, where image forming apparatus 30 adds the number of sheets printed to the count 121.

When MFP 100 has a trouble, job executing portion 53 temporarily stores the print job in EEPROM 113 or destroys the print job, instead of causing image forming apparatus 30 to form an image based on the print job. When stored in EEPROM 113, the print job is preferably provided with a flag indicating that no printing was carried out for the print job, thereby distinguishing the print job from print jobs for which printing was carried out.

Requesting portion 55 accepts input of the print job from job accepting portion 51. When MFP 100 has a trouble and printing is thereby impossible at image forming apparatus 30, then requesting portion 55 transmits an alternative instruction including the print job to MFP 100A, which is the alternative printer. As information for specifying the alternative printer, the apparatus identification information of MFP 100A may be stored in EEPROM 113 in advance. The apparatus identification information is location information of MFP 100A on network 2. The alternative printer may be determined arbitrarily from among the group of MFPs 100A, 100B, 100C, and printer 300. Alternatively, it is possible to make an inquiry to network 2 by broadcast and to choose one of responding apparatuses as the alternative printer.

CPU 111A of MFP 100A, which is the alternative printer, includes an alternative instruction receiving portion 71 to receive an alternative instruction, an alternative job executing portion 73 to execute a job included in the alternative instruction, a count instruction transmitting portion 75 to transmit a count instruction, and a second charge calculating portion 81 to calculate a charge.

Alternative instruction receiving portion 71 receives the alternative instruction from MFP 100, which is the designated printer. When MFP 100 transmits the alternative instruction, data communication control portion 117 receives the print job. Alternative instruction receiving portion 71 accepts the print job received by data communication control portion 117. Along with the alternative instruction, data communication control portion 117 receives apparatus identification information for identifying MFP 100. The apparatus identification information is an IP address allotted to MFP 100. The apparatus identification information received along with the print job is information for specifying the transmitting source of the alternative instruction. This enables the alternative printer MFP 100A to specify the designated printer MFP 100 and to transmit to the designated printer a count instruction, described later. Alternative instruction receiving portion 71 outputs the print job included in the alternative instruction to alternative job executing portion 73.

Alternative job executing portion 73 acquires the apparatus attribute of MFP 100, which is the transmitting source of the alternative instruction, based on the apparatus identification information for identifying MFP 100, which is received along with the alternative instruction. The apparatus attributes of MFPs 100, 100A, 100B, 100C, and printer 300 may be stored in EEPROM 113A in advance, or alternative job executing portion 73 may receive the apparatus attribute of MFP 100 from MFP 100 itself by demanding MFP 100 to transmit the apparatus attribute. The apparatus attribute includes whether the apparatus is for monochrome printing only or for both color and monochrome printing, and a unit charge for printing (print unit charge). Alternative job executing portion 73, upon input of the print job from alternative instruction receiving portion 71, controls image forming apparatus 30 to have print data included in the print job printed according to print conditions. When the apparatus attribute of MFP 100, which is the transmitting source of the alternative instruction, denotes that MFP 100 is dedicated to monochrome printing while color printing is specified as a print condition, then alternative job executing portion 73, before printing, changes the print condition to monochrome printing. The compulsive monochrome printing is for the purpose of precluding the malicious attempt to have a lower charge than is actually due.

EEPROM 113A of MFP 100A has an area for storing a count 121A to count the number of sheets printed by image forming apparatus 30, and an area for storing unit charge table 123A. Alternative job executing portion 73 compares the unit charge employed by the designated printer MFP 100 with the unit charge employed by MFP 100A. The unit charge of MFP 100A is determined from count 121A and unit charge table 123A. The unit charge of the designated printer is included in the attribute information received from the designated printer. The unit charge of the designated printer may be stored in EEPROM 113A in advance, instead of being received from the designated printer.

When causing image forming apparatus 30 to form an image based on the print job included in the alternative instruction, alternative job executing portion 73 does not update count 121A when the unit charge of MFP 100A is higher than the unit charge of MFP 100, and updates count 121A when the unit charge of MFP 100A is lower than the unit charge of MFP 100. This is to charge against the apparatus with a lower unit charge. While in this embodiment a comparison is made between the unit charge of the designated printer MFP 100 and the unit charge of the alternative printer MFP 100A, EEPROM 113 may store in advance which of the printers to charge against.

When count 121A is not updated, i.e., when the unit charge of MFP 100A is not lower than the unit charge of the designated printer MFP 100, then alternative job executing portion 73 outputs a print completion signal to count instruction transmitting portion 75 upon every completion of printing of one sheet by image forming portion 30 based on the print job. That is, alternative job executing portion 73 outputs to count instruction transmitting portion 75 as many print completion signals as the number of sheets printed by image forming portion 30 during execution of the print job. Output of the print completion signal after completion of printing of one sheet is for the purpose of preventing erroneous charging for discontinued printing when image forming portion 30 fails because of an error or trouble before completion of the printing. Alternative job executing portion 73 may output to count instruction transmitting portion 75 a print completion signal including the number of sheets printed upon completion of printing of all the intended number of sheets by image forming portion 30 based on the print job.

When count 121A is updated, i.e., when the unit charge of MFP 100A is lower than the unit charge of the designated printer MFP 100, then alternative job executing portion 73 updates 121A by adding "1" thereto upon every printing of one sheet by image forming apparatus 30 based on the print job. When updating count 121A, alternative job executing portion 73 does not output a print completion signal to count instruction transmitting portion 75 even though portion 73 causes image forming portion 30 to carry out printing based on the print job. While in this embodiment alternative job executing portion 73 updates 121A upon every completion of printing of one sheet by image forming portion 30, count 121A may be updated upon completion of the print job by adding the number of sheets printed to count 121A.

Count instruction transmitting portion 75 transmits a count instruction to the designated printer MFP 100, which has transmitted the alternative instruction, upon every input of the print completion signal from alternative job executing portion 73. The count instruction therefore denotes completion of printing of one sheet by the alternative printer MFP 100A. When the print completion signal output from alternative job executing portion 73 includes the number of sheets printed, count instruction transmitting portion 75 transmits a count instruction including the number of sheets printed (number of alternative sheets) to the designated printer MFP 100.

In CPU 111 of the designated printer MFP 100, count instruction receiving portion 57 receives the count instruction from the alternative printer MFP 100A. Upon transmission of the count instruction by MFP 100A, data communication control portion 117 receives the count instruction. It is the count instruction received by data communication control portion 117 that count instruction receiving portion 57 accepts. Count instruction receiving portion 57, upon reception of the count instruction, outputs the count instruction to first charge calculating portion 61.

First charge calculating portion 61 includes an adding portion 63. Adding portion 63 accepts input of the count instruction from count instruction receiving portion 57. Since the count instruction denotes completion of printing of one sheet by the alternative printer MFP 100A, adding portion 63 updates count 121, which is included in EEPROM 113, by adding to the count 121 the number "1", which denotes that the number of sheets printed by the alternative printer MFP 100A is one. When the count instruction includes the number of alternative sheets, then adding portion 63 updates count 121, which is included in EEPROM 113, by adding to count 121 the number of alternative sheets, which are by the alternative printer MFP 100A.

First charge calculating portion 61 calculates the charge using count 121 and a unit charge determined by unit charge table 123. Unit charge table 123 includes records that specify unit charges each corresponding to a particular number of sheets printed. The records are stored in EEPROM 113 in advance. Here the unit charge table includes a record that specifies 9 yens as a unit charge per sheet for 0 to 500 sheets printed, a record that specifies 8 yens as a unit charge per sheet for 501 to 1000 sheets printed, a record that specifies 7 yens as a unit charge per sheet for 1001 to 3000 sheets printed, and a record that specifies 6 yens as a unit charge per sheet for equal to or more than 3001 sheets printed. First charge calculating portion 61 calculates the charge corresponding to the number of sheets printed by multiplying count 121 by the unit charge that corresponds to count 121 in the unit charge table. For example, when count 121 is 3500, the unit charge is 6 yens, resulting in a charge of 21000 yens.

It is possible to set 4500 yens for 500 sheets, which is in the first number range, as the minimum charge. In this case, the charge is 4500 yens for all the cases where count 121 is less than 500.

It is possible for MFP 100 to act as an alternative printer. Thus, when the unit charge of MFP 100 is lower than the unit charge of a designated printer, then count 121, which is stored in EEPROM 113, has added therein the number of sheets printed based on a print job included in an alternative instruction received from the designated printer.

Second charge calculating portion 81 in CPU 111A of the alternative printer MFP 100A calculates the charge using count 121A and a unit charge determined by unit charge table 123A. Unit charge table 123A includes records that specify unit charges each corresponding to a particular number of sheets printed. The records are stored in EEPROM 113A in advance. Here the unit charge table includes a record that specifies 10 yens as a unit charge per sheet for 0 to 500 sheets printed, a record that specifies 9 yens as a unit charge per sheet for 501 to 1000 sheets printed, a record that specifies 8 yens as a unit charge per sheet for 1001 to 3000 sheets printed, and a record that specifies 7 yens as a unit charge per sheet for equal to or more than 3001 sheets printed. Second charge calculating portion 81 calculates a charge corresponding to the number of sheets printed by multiplying count 121A by the unit charge that corresponds to count 121A in the unit charge table. For example, when count 121A is 3500, the unit charge is 7 yens, resulting in a charge of 24500 yens.

It is possible to set 5000 yens for 500 sheets, which is in the first number range, as the minimum charge. In this case, the charge is 5000 yens for all the cases where count 121A is less than 500.

Since MFP 100A may act as a designated printer, count 121A, which is stored in EEPROM 113A, has added therein the number of sheets printed based on a print job received from PC 200, plus, when an alternative instruction is transmitted to an alternative printer and the unit charge of the alternative printer is lower than the unit charge of MFP 100A, the number of sheets printed by an alternative printer.

Figure 4:
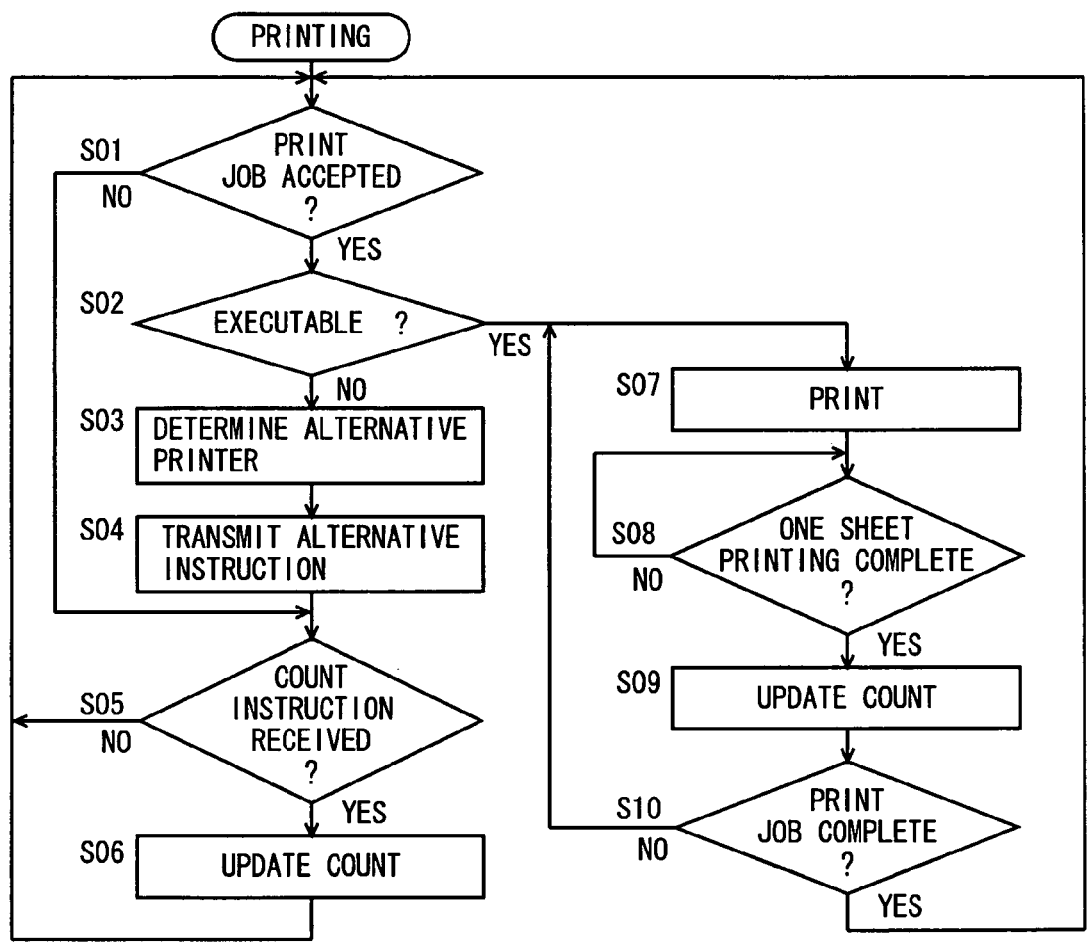
FIG. 4 is a flowchart showing an example of the flow of a print process executed by a designated printer.

FIG. 4 is a flowchart showing an example of the flow of a print process executed by a designated printer. The print process is executed by a designated printer among MFPs 100, 100A, 100B, 100C, and printer 300. Here MFP 100 is taken as an example of the designated printer. The print process is executed at CPU 111 of the designated printer MFP 100 by executing a program for counting the number of sheets printed. Referring to FIG. 4, CPU 111 judges whether MFP 100 accepts a print jog (step S01). When the print job is accepted, the process proceeds to step S02, and otherwise, the process proceeds to S05. In step S05, CPU 111 judges whether MFP 100 accepts a count instruction. When the count instruction is accepted, the process proceeds to step S06, and otherwise, the process goes back to step S01. That is, the print process is executed when CPU 111 accepts the print job or the count instruction.

When MFP 100 accepts the print job in step S01, the process proceeds to step S02. Here description will be made of the print job being transmitted from PC 200. The process may proceed to step S02 upon receipt of a copy job instead of the print job. In the case of the copy job, CPU 111 causes image forming portion 30 to carry out printing based on image data resulting from reading of text by image reading portion 20. There may be such a trouble that image forming portion 30 cannot be activated while image reading portion 20 can. In this case, an alternative printer may be caused to execute a print job specifying that the alternative printer print the image data output from image reading portion 20.

In step S02, CPU 111 judges whether MFP 100 is available for executing the print job. When MFP 100 is available for executing the print job, the process proceeds to step S07, and when MFP 100 is not available for executing the print job, the process proceeds to step S03. For example, MFP 100 is judged to be unavailable for executing the print job when a trouble is detected which makes image forming impossible, and judged to be available when no trouble is detected. That is, the state of suspense because of an error is encompassed by the state of being available for printing.

In step S07, CPU 111 executes the print job. Specifically, CPU 111 carries out printing based on print data included in the print job according to print conditions. CPU 111 then judges whether printing of one sheet is complete (step S08). The process turns into a stand-by state until completion of printing of one sheet, and proceeds to step S09 upon completion of printing of one sheet. When, however, a trouble occurs and printing is thereby impossible, the process is terminated. In step S09, CPU 111 updates count 121 by adding thereto the number "1", which denotes that the number of sheets printed is one. Since count 121 is updated only when printing of one sheet is complete, count 121 is not updated when printing is disabled by a trouble or the like before completion of the printing, thereby enabling it to properly count the number of sheets printed which serves as the basis on which a charge is calculated.

In step S10, CPU 111 judges whether printing of the print job is complete. Specifically, CPU 111 judges for completion of printing of all the print data included in the print job and of printing of the number of sheets specified as a print condition. When printing of the print job is complete, the process goes back to step S01, and otherwise, the process goes back to step S07 for execution of next printing.

In step S03, CPU 111 determines an alternative printer. Here CPU 111 determines MFP 100A as the alternative printer by reading from EEPROM 113 alternative printer information denoting that MFP 100A is the alternative printer.

CPU 111 then transmits an alternative instruction to the alternative printer (step S04). The alternative instruction includes the print job accepted in step S01. This secures execution of the print job by the alternative printer when a trouble prevents printing at the designated printer, thereby enabling immediate execution of the print job. After transmitting the alternative instruction, CPU 111 informs PC 200 that the printing is carried out by the alternative printer. Thus, the user of PC 200, who has designated MFP 100 and input an instruction that the print job be transmitted to MFP 100, is informed that the print job is printed by the alternative printer MFP 100A. Thus, the user knows that he/she needs to go to MFP 100A, not MFP 100, to fetch the printed sheets, since MFP 100A actually brings out the printed sheets.

In step S05, CPU 111 judges whether MFP 100 accepts the count instruction. When the count instruction is accepted, the process proceeds to step S06. In step S06, CPU 111 updates count 121 by adding thereto the number "1", which denotes that the number of times the count instruction is received is one. The count instruction is transmitted to the designated printer MFP 100 from the alternative printer MFP 100A upon every completion of printing of one sheet by MFP 100A. Thus, the count instruction denotes that the alternative printer MFP 100A has completed printing of one sheet. Since count 121 is updated only when the alternative printer MFP 100A completes printing of one sheet, count 121 is not updated when printing is disabled by a trouble or the like before completion of the printing at MFP 100A, thereby enabling it to properly count the number of sheets printed which serves as the basis on which a charge is calculated.

Figure 5:
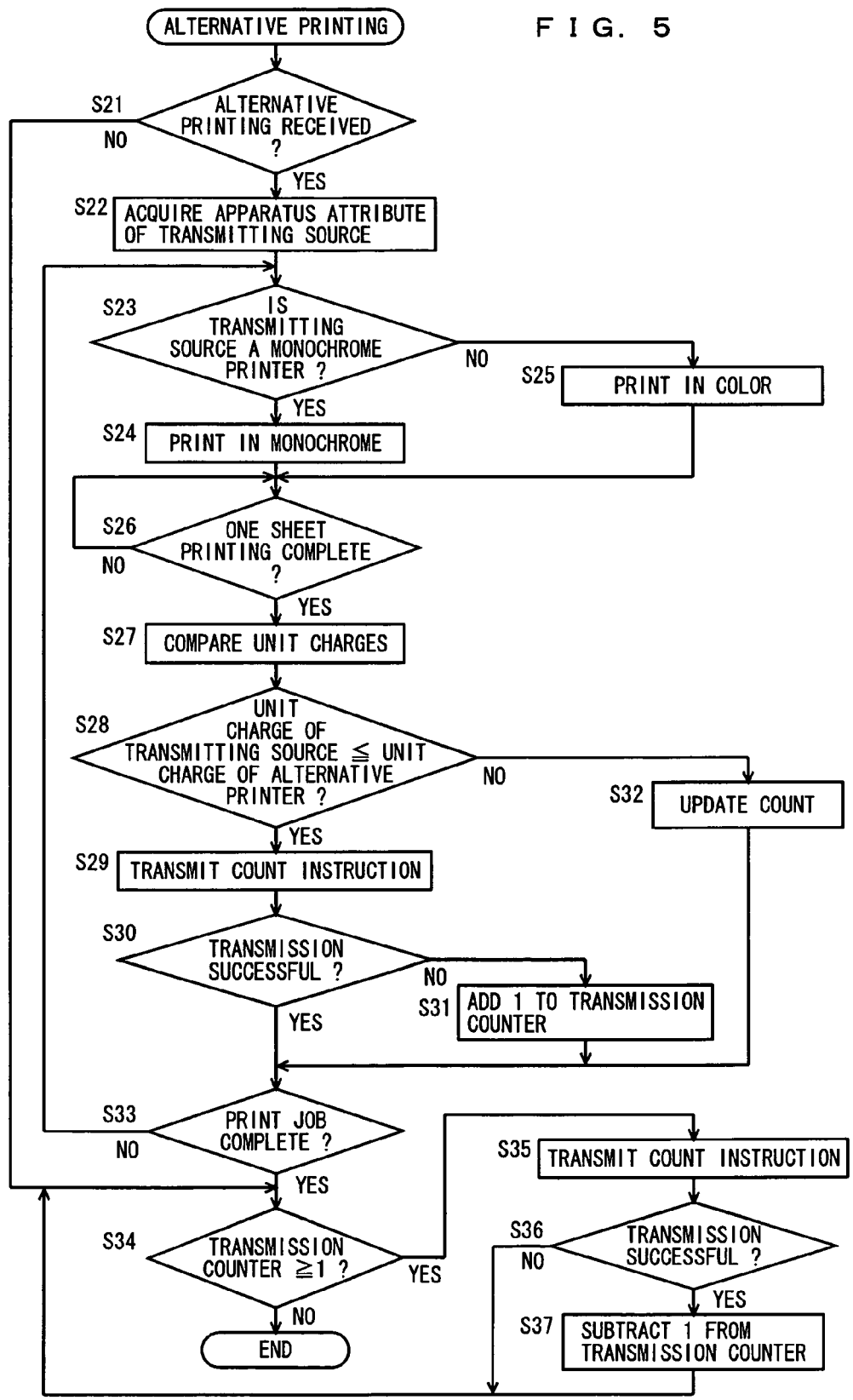
FIG. 5 is a flowchart showing an example of the flow of an alternative print process.

FIG. 5 is a flowchart showing an example of the flow of an alternative print process. The alternative print process is executed by a designated printer among MFPs 100, 100A, 100B, 100C, and printer 300. Here MFP 100A is taken as an example of the alternative printer. The alternative print process is executed by CPU 111A of the alternative printer MFP 100A by executing a program for counting the number of sheets printed. Referring to FIG. 5, CPU 111A judges whether MFP 100A receives an alternative instruction (step S21). When the alternative instruction is received, the process proceeds to step S22, and otherwise, the process proceeds to S34.

In step S22, CPU 111A acquires attribute information on the designated printer, which is the transmitting source of the alternative instruction. Here CPU 111A reads the apparatus attribute of MFP 100 stored in EEPROM 113. CPU 111A then judges whether the designated printer MFP 100 is an apparatus dedicated to monochrome printing (step S23). When MFP 100 is a monochrome printing apparatus, the process proceeds to step S24, and otherwise, the process proceeds to step S25. In step S24, CPU 111A carries out monochrome printing, and the process proceeds to step S26. When the designated printer is a monochrome-dedicated printer and the alternative printer is capable of color printing, the print condition is compulsively set to monochrome printing. This precludes the malicious attempt to enjoy color printing at monochrome printing rates. In step S25, CPU 111A carries out color printing, and the process proceeds to step S26.

In step S26, CPU 111A judges whether printing of one sheet is complete. The process turns into a stand-by state until completion of printing of one sheet, and proceeds to step S27 upon completion of printing of one sheet. When, however, a trouble occurs and printing is thereby impossible, the process is terminated.

In step S27, CPU 111A compares the unit charge employed by the designated printer MFP 100 with the unit charge employed by MFP 100A. Specifically, CPU 111A reads the apparatus attribute of MFP 100 stored in EEPROM 113A in advance. The unit charge is included in the apparatus attribute. CPU 111A then judges whether the unit charge of the designated printer, which has transmitted the alternative instruction, is lower than the unit charge of MFP 100A (step S28). When the unit charge of the transmitting source is lower than the unit charge of the alternative printer, the process proceeds to step S29, and otherwise, the process proceeds to step S32. In step S29, CPU 111A transmits the count instruction to the designated printer, which is the transmitting source.

In step S30, CPU 111A judges whether transmission of the count instruction is successful. When the transmission is successful, the process proceeds to step S33. When the transmission is not successful, the number "1" is added to a transmission counter (step S31), after which the process proceeds to step S33. The transmission counter counts the number of untransmitted count instructions resulting from unsuccessful transmission. Since the count instruction denotes that the alternative printer has printed one sheet of paper, the transmission counter denotes the number of sheets, among the number of sheets printed by the alternative printer, that is yet to be counted for calculating the charge at the designated printer. In step S33, CPU 111A judges whether printing of the print job is complete. Specifically, CPU 111A judges for completion of printing of all the print data included in the print job and of printing of the number of sheets specified as a print condition. When printing of the print job is complete, the process proceeds to step S34, and otherwise, the process goes back to step S23 for execution of next printing.

In step S32, CPU 111A updates count 121A by adding thereto the number "1", which denotes that the number of printed is one, after which the process proceeds to step S33. Since count 121A is updated only when printing of one sheet is complete, count 121A is not updated when printing is disabled by a trouble or the like before completion of the printing, thereby enabling it to properly count the number of sheets printed which serves as the basis on which a charge is calculated.

In step S34, CPU 111A judges whether the transmission counter denotes a value of more than one. When the value is more than one, the process proceeds to step S35, and otherwise, the process is terminated. In step S35, CPU 111A transmits the count instruction to the designated printer, which is the transmitting source. In step S36, CPU 111A judges whether transmission of the count instruction is successful. When the transmission is successful, the process proceeds to step S37, and when the transmission is not successful, the process goes back to step S34. In step S37, CPU 111A subtracts the number "1" from the transmission counter. This is because the transmission counter counts the number of untransmitted count instructions. The count instructions are transmitted to the designated printer until the value of the transmission counter is zero. This enables the designated printer to make count 121 a reliable value for calculating the charge.

Figure 6:
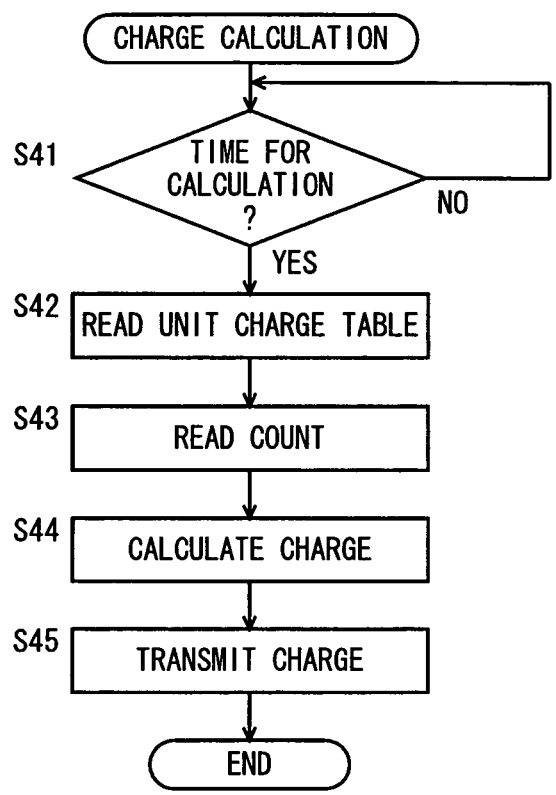
FIG. 6 is a flowchart showing an example of the flow of a charge calculating process.

FIG. 6 is a flowchart showing an example of the flow of a charge calculating process. The charge calculating process is executed by MFPs 100, 100A, 100B, and 100C. Here CPU 111 of MFP 100 will be taken as an example for executing the charge calculating process. The charge calculating process is executed at CPU 111 of MFP 100 by executing a program for counting the number of sheets printed.

Referring to FIG. 6, CPU 111 judges whether today is a proper time for calculating the charge (step S41). The time for calculating the charge is stored in EEPROM 113 in advance, preferably a predetermined date such as the end of the month. The process turns into a stand-by state until the time for calculating the charge comes, and proceeds to step S42 when the time for calculating the charge comes. That is, the charge calculating process is executed only when the time for calculating the charge comes.

CPU 111 then reads unit charge table 123 from EEPROM 113 (step S42), and reads count 121 from EEPROM 113 (step S43). CPU 111 then calculates the charge (step S44). Specifically, the calculated charge corresponding to the number of sheets printed is a product of count 121 and a unit charge corresponding to count 121, which is specified in the unit charge table. For example, when count 121 is 2000, the unit charge 8 yens is multiplied by 2000, resulting in a charge of 16000 yens.

CPU 111 then transmits the calculated charge to a predetermined destination (step S45). The destination is, for example, the server that controls MFP 100. The transmission may be carried out through LAN 2 or by mobile phone. Alternatively, the calculated charge may not be transmitted but stored in EEPROM 113 of MFP 100.

As has been described hereinbefore, in print system 1 according to this embodiment, when the designated printer MFP 100 accepts a print job and is available for executing the print job, then MFP 100 carries out printing based on the print job. When the designated printer MFP 100 is not available for executing the print job, MFP 100 transmits an alternative instruction including the print job to the alternative printer MFP 100A. MFP 100 then adds the number of sheets (number of alternative sheets) printed by the alternative printer MFP 100A based on the print job included in the alternative instruction to the number (count 121) of sheets printed by the designated printer MFP 100 itself, thereby updating count 121. Since the charge is calculated based on the number (count 121) of sheets printed, when the charge is calculated, even the highest unit charge is one specified in the familiar MFP 100, irrespective of the unit charge of the alternative printer MFP 100A. This prevents charging of a higher amount of money than the user expected.

The alternative printer MFP 100A, upon receipt of the alternative instruction including the print job from the designated printer MFP 100, transmits a count instruction to the designated printer MFP 100 upon every printing by MFP 100A based on the print job included in the alternative instruction. When the count instruction is not transmitted, the number of sheets printed by MFP 100A is added to count 121A, thereby updating count 121A. Thus, no charge is incurred against MFP 100A when MFP 100A carries out printing based on the print job received from the designated printer MFP 100, thereby preventing charging of an amount of money against the user's will.

Since the alternative printer MFP 100A transmits the count instruction only when the unit charge of MFP 100A is not lower than the unit charge of the designated printer MFP 100, the calculated charge can be based on a lower unit charge, thereby enabling it to minimize the charge.

When the designated printer MFP 100 provides only monochrome printing, the alternative printer MFP 100A carries out monochrome printing of the print job. This is for the purpose of precluding the malicious attempt to, when the unit charge for color printing is higher than the unit charge for monochrome printing, enjoy color printing at a lower unit charge for monochrome printing.

Second Embodiment

Figure 7:
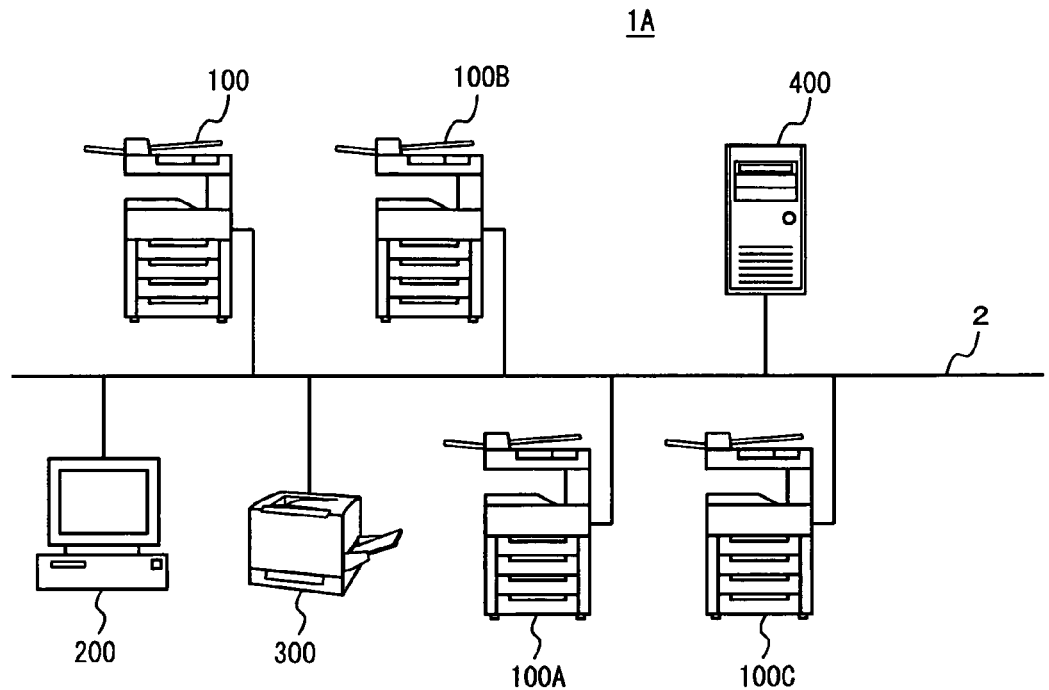
FIG. 7 is a schematic diagram of a print system according to a second embodiment of the present invention.

A print system according to a second embodiment will be described. FIG. 7 is a schematic diagram of the print system according to the second embodiment of the present invention. Referring to FIG. 7, a print system 1A according to the second embodiment includes MFPs 100, 100A, 100B, 100C, a PC 200, a printer 300, and a print server 400 each connected to a network 2.

MFPs 100, 100A, 100B, and 100C are image forming apparatuses against which an amount of money is charged for printing, while printer 300 is an image forming apparatus against which an amount of money is not charged for printing. MFPs 100, 100A, 100B, and 100C have the same structures and functions, and therefore MFP 100 will be taken as an example here unless stated otherwise.

In print system 1A according to the second embodiment, a print job is first transmitted from PC 200 to print server 400, which controls the print job. For simplicity of description, the case where PC 200 transmits to MFP 100 a print job designating MFP 100 when printing is impossible at MFP 100 because of a trouble will be exemplified. Also the case where MFP 100A is set in print server 400 as an alternative printer for MFP 100 will be exemplified. In this case, MFP 100 is the designated printer and MFP 100A is the alternative printer. Thus, in print system 1A according to the second embodiment, printer server 400 assumes some of the functions possessed by the designated printer MFP 100 and the alternative printer MFP 100A in print system 1 according to the first embodiment. Description will be made mainly of differences relative to the first embodiment.

Figure 8:
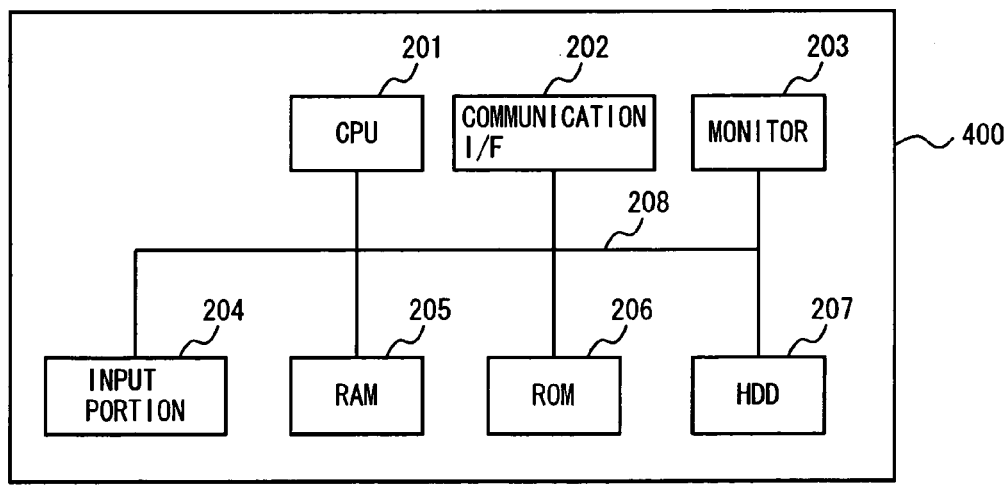
FIG. 8 is a diagram showing an example of the hardware structure of a print server according to the second embodiment.

FIG. 8 is a diagram showing an example of the hardware structure of the print server. Referring to FIG. 8, print server 400 includes a CPU 201, a RAM 205 used as a working area for CPU 201, a ROM 206 that stores a program or the like to be executed at CPU 201, a hard disk drive (HDD) 207, a communication I/F 202 for connecting print server 400 to network 2, an input portion 204 such as a keyboard and a mouse, and a monitor 203, each connected to bus 208.

Figure 9:
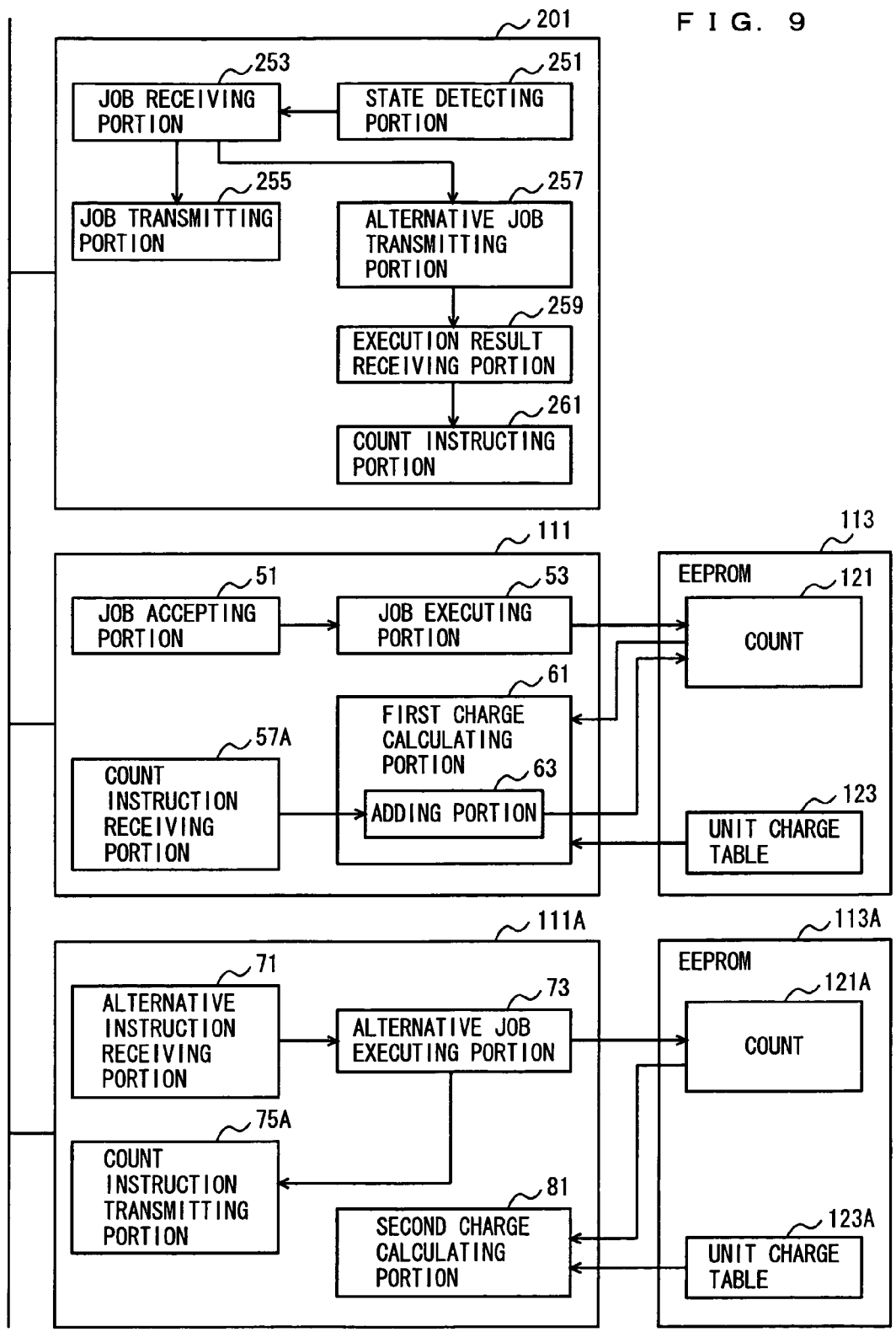
FIG. 9 is a functional block diagram schematically showing the functions of a print system according to a second embodiment.

FIG. 9 is a functional block diagram schematically showing the functions of the print system according to the second embodiment. Here MFP 100 is taken as an example of the designated printer and MFP 100A as the alternative printer. FIG. 9 shows the functions of CPU 201 of print server 400, the functions of CPU 111 of MFP 100 when acting as the designated printer, the functions of CPU 111A of MFP 100A when acting as the alternative printer, and information stored in EEPROMs 113 and 113A respectively connected to CPUs 111 and 111A.

Referring to FIG. 9, CPU 201 of print server 400 includes a state detecting portion 251 to detect the states of the apparatuses to be controlled by print server 400, a job receiving portion 253 to receive a print job, a job transmitting portion 255 to transmit the print job to the designated printer, an alternative job transmitting portion 257 to transmit the print job to the alternative printer, an execution result receiving portion 259 to receive an execution result from the alternative printer, and a count instructing portion 261 to instruct the designated printer to carry out counting.

CPU 111 of MFP 100 differs from the FIG. 3 embodiment in that there is no requesting portion 55 and that a count instruction receiving portion 57A has a change in count instruction receiving portion 57. The rest of the functions are the same. CPU 111A of MFP 100A differs from the FIG. 3 embodiment in that a count instruction transmitting portion 75A has a change in count instruction transmitting portion 75. The rest of the functions are the same.

State detecting portion 251 detects the states of the apparatuses to be controlled by print server 400. The apparatuses to be controlled here are MFPs 100, 100A, 100B, 100C, and printer 300. State detecting portion 251 detects the states of MFPs 100, 100A, 100B, 100C, and printer 300 by, for example, acquiring from MFPs 100, 100A, 100B, 100C, and printer 300 an MIB (Management Information Base).

Job receiving portion 253 receives the print job transmitted from PC 200. When PC 200 transmits to print server 400 a print job that designates MFP 100 as the designated printer, then communication I/F 202 receives the print job. It is the print job received by communication I/F 202 that job receiving portion 253 accepts. In addition to the print job, communication I/F 202 receives apparatus identification information for identifying PC 200. The apparatus identification information is transmitting source information for specifying the transmitting source of the print job. While the case of receiving the transmitting source information and the print job as separate items is exemplified, the print job may include the transmitting source information. Job receiving portion 253 transmits the print job to job transmitting portion 255 or to alternative job transmitting portion 257.

Job receiving portion 253 judges whether the designated printer is available for printing. Specifically, job receiving portion 253 judges the state of MFP 100, which is designated as the designated printer by the received print job. The availability for printing encompasses all but the case where MFP 10 is suspended because of a trouble and therefore unavailable for printing. For example, the state of suspense because of an error is encompassed by the state of being available. When the designated printer MFP 100 is available for printing, job receiving portion 253 outputs the print job to job transmitting portion 255. When the designated printer MFP 100 is not available for printing, job receiving portion 253 outputs the print job to alternative job transmitting portion 257.

Job transmitting portion 255 transmits the print job input from job receiving portion 253 to the designated printer MFP 100. The printed job transmitted by job transmitting portion 255 is received by job accepting portion 51 and executed by job executing portion 53 of the designated printer MFP 100. This causes count 121 to be updated by addition thereto of the number of sheets printed by job executing portion 53 based on the print job.

Alternative job transmitting portion 257 transmits, to the alternative printer for the designated printer, an alternative instruction including the print job input from job receiving portion 253. Here the apparatus attribute of MFP 100A, which includes information for specifying the alternative printer for MFP 100, may be stored in HDD 207 in advance. The alternative printer for the designated printer MFP 100 may be determined arbitrarily from among the group of MFPs 100A, 100B, 100C, and printer 300. Alternatively, it is possible to make an inquiry to network 2 by broadcast and to choose one of responding apparatuses as the alternative printer.

The alternative instruction transmitted from alternative job transmitting portion 257 is received by an alternative instruction receiving portion 71 and executed by an alternative job executing portion 73 of the alternative printer MFP 100A. When the unit charge of MFP 100A is lower than the unit charge of MFP 100, a count 121A is updated such that the number of sheets printed by alternative job executing portion 73 based on the print job is added to count 121A. When, contrarily, the unit charge of MFP 100A is not lower than the unit charge of MFP 100, then count instruction transmitting portion 75A transmits to print server 400 as many number of count instructions as the number of sheets printed by alternative job executing portion 73 based on the print job.

Execution result receiving portion 259 of print server 400 receives the count instruction from the alternative printer MFP 100A. Count instructing portion 261 transmits a count instruction to the designated printer MFP 100 every time execution result receiving portion 259 receives the count instruction. When the designated printer MFP 100 does not receive the count instruction, count instructing portion 261 stores the number of untransmitted count instructions and transmits the count instructions until MFP 100 receives the count instructions. This secures transmission of the count instruction to the designated printer MFP 100.

The count instruction transmitted from count instructing portion 261 is received by count instruction receiving portion 57A of the designated printer MFP 100. The count instruction received by count instruction receiving portion 57A is output to an adding portion 63 of a first charge calculating portion 61. Adding portion 63 adds the number "1", which denotes that the number of sheets printed by the alternative printer MFP 100A is one, to the count 121 stored in EEPROM 113, thereby updating count 121. When the count instruction includes the number of alternative sheets, which are printed by the alternative printer MFP 100A, then adding portion 63 updates count 121, which is stored in EEPROM 113, by adding to the count 121 the number of alternative sheets, which are printed by the alternative printer MFP 100A.

It is possible for MFP 100 to act as an alternative printer. Thus, when the unit charge of MFP 100 is lower than the unit charge of a designated printer, then count 121, which is stored in EEPROM 113, has added therein the number of sheets printed based on a print job included in an alternative instruction received from the designated printer.

Since MFP 100A may act as a designated printer, count 121A, which is stored in EEPROM 113A, has added therein the number of sheets printed based on a print job received from PC 200, plus, when an alternative instruction is transmitted to an alternative printer and the unit charge of the alternative printer is lower than the unit charge of MFP 100A, the number of sheets printed by an alternative printer.

Figure 10:
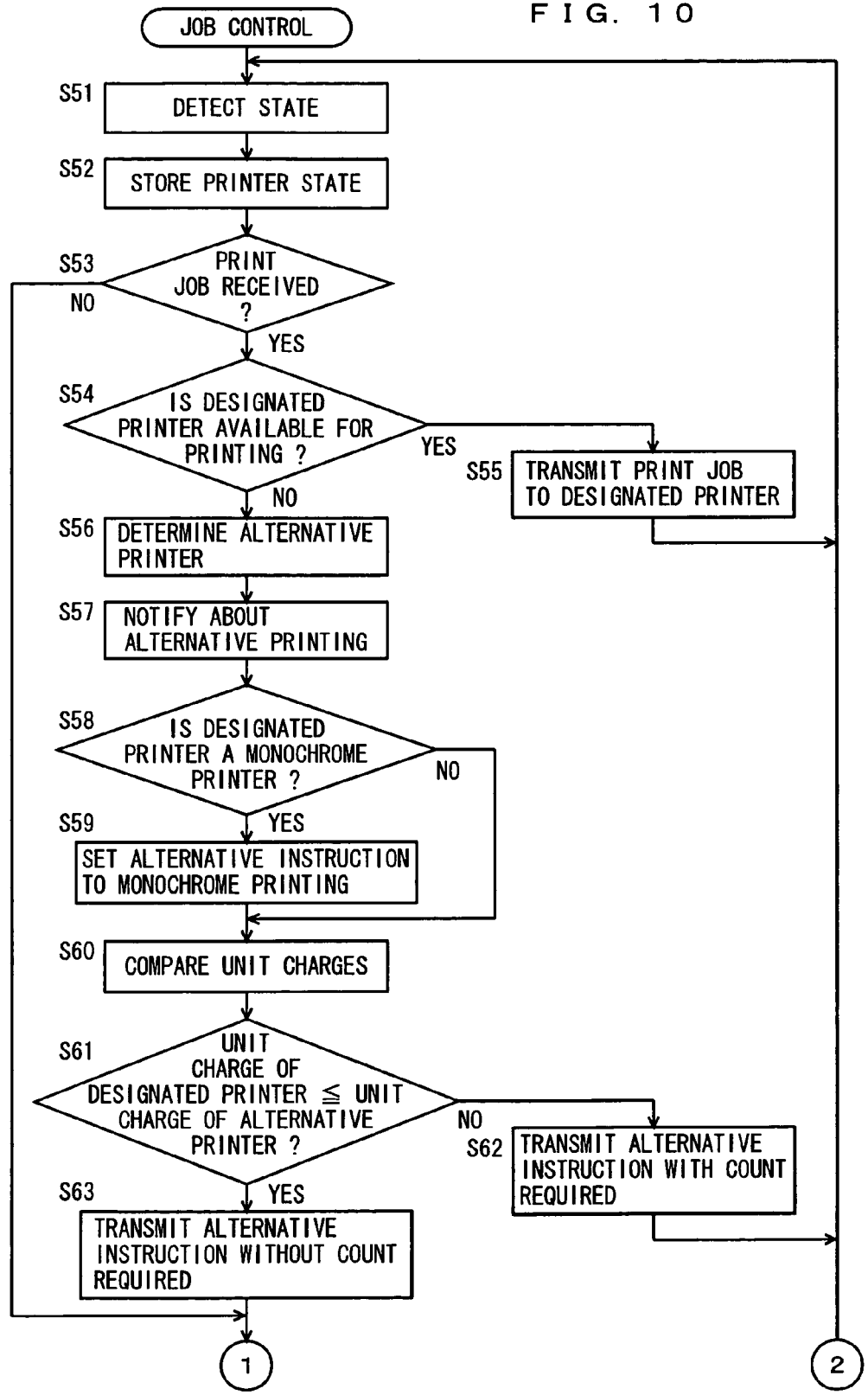
FIG. 10 is a first flowchart showing an example of the flow of a job control process.
Figure 11:
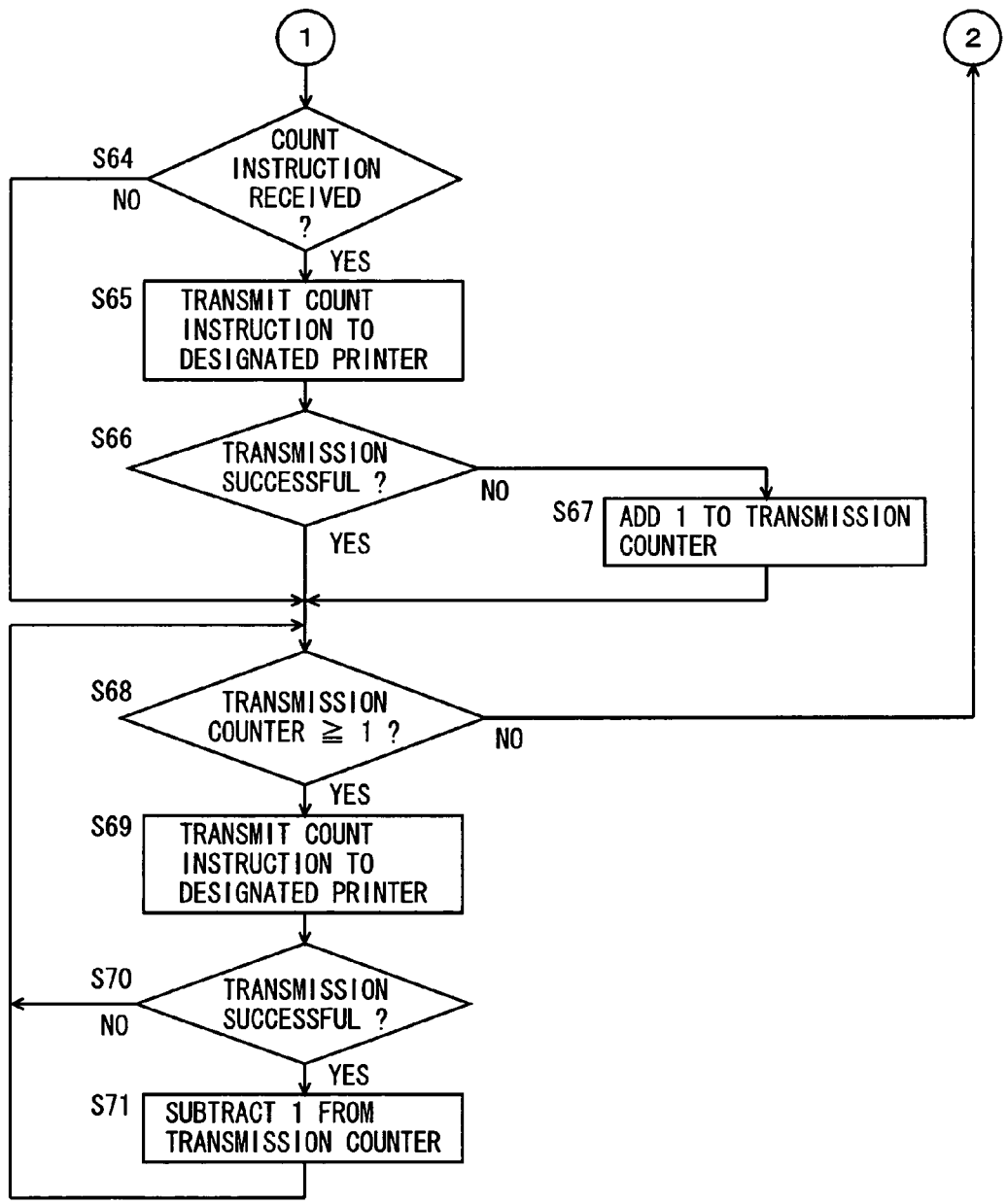
FIG. 11 is a second flowchart showing an example of the flow of a job control process.

FIGS. 10 and 11 are flowcharts showing examples of the flow of a job control process. The job control process is executed at CPU 201 of print server 400 by executing a charge calculating program. Referring to FIGS. 10 and 11, CPU 201 detects the states of the apparatuses to be controlled by print server 400 (step S51). Here CPU 201 detects the states of MFPs 100, 100A, 100B, 100C, and printer 300 by acquiring an MIB from each of the MFPs 100, 100A, 100B, 100C, and printer 300. CPU 201 then stores the detected states of MFPs 100, 100A, 100B, 100C, and printer 300 in HDD 207 (step S52).

Next, CPU 201 judges whether print server 400 receives a print job (step S53). When the print job is received, the process proceeds to step S54, and otherwise, the process proceeds to S64. In step S54, CPU 201 judges whether the designated printer designated by the print job is available for printing. The availability for printing is judged, in step S52, based on the state stored in HDD 207. When the designated printer is available for printing, the process proceeds to step S55, and when designated printer is not available for printing, the process proceeds to step S56. In step S55, CPU 201 transmits the print job to the designated printer MFP 100, and the process goes back to step S51.

In step S56, CPU 201 determines an alternative printer for the designated printer MFP 100. CPU 201 then informs PC 200, which has transmitted the print job, that alternative printing is carried out by the alternative printer (step S57). Specifically, CPU 201 transmits to PC 200 a message denoting that printing is carried out by the alternative printer MFP 100A in place of the designated printer MFP 100. Thus, the user of PC 200 is able to know that the print job is carried out by and printed out from the alternative printer MFP 100A. Thus, the user knows that he/she needs to go to MFP 100A, not the designated printer MFP 100, to fetch the printed sheets, since MFP 100A actually brings out the printed sheets.

Next, CPU 201 judges whether the designated printer MFP 100 is an apparatus dedicated to monochrome printing (step S58). When MFP 100 is a monochrome printing apparatus, the process proceeds to step S59, and otherwise, the process skips step S59 and proceeds to step S60. In step S59, CPU 201 sets the alternative instruction to monochrome printing. Specifically, CPU 201 changes the print condition included in the print job to monochrome printing. This precludes the malicious attempt to, when the designated printer is a monochrome printing apparatus and the alternative printer provides color printing, enjoy color printing at a charge for monochrome printing.

In step S60, CPU 201 compares the unit charge employed by the designated printer MFP 100 with the unit charge employed by the alternative printer MFP 100A. Here the unit charges of MFPs 100 and 100A may be stored in HDD 207 in advance. CPU 201 then judges whether the unit charge of the designated printer MFP 100 is lower than the unit charge of the alternative printer MFP 100A (step S61). When the unit charge of the designated printer MFP 100 is lower than the unit charge of the alternative printer MFP 100A, the process proceeds to step S63, and otherwise, the process proceeds to step S62. In step S63, CPU 201 transmits to the alternative printer MFP 100A an alternative instruction without a count required, and the process proceeds to step S64. In step S62, CPU 201 transmits to the alternative printer MFP 100A an alternative instruction with a count required, and the process goes back to step S51.

In step S64, CPU 201 judges whether print server 400 receives a count instruction from the alternative printer MFP 100A. When the count instruction is received, the process proceeds to step S65, and otherwise, the process proceeds to step S68.

In step S65, CPU 201 transmits the count instruction to the designated printer MFP 100. CPU 201 then judges whether transmission of the count instruction is successful (step S66). When the transmission is successful, the process proceeds to step S68. When the transmission is not successful, the number "1" is added to a transmission counter (step S67), after which the process proceeds to step S68. The transmission counter counts the number of untransmitted count instructions resulting from unsuccessful transmission. Since the count instruction denotes that the alternative printer has printed one sheet of paper, the transmission counter denotes the number of sheets, among the number of sheets printed by the alternative printer, that is yet to be counted for calculating the charge at the designated printer.

In step S68, CPU 201 judges whether the transmission counter denotes a value of more than one. When the value is more than one, the process proceeds to step S69, and otherwise, the process goes back to step S51. In step S69, CPU 201 transmits the count instruction to the designated printer MFP 100. In step S70, CPU 201 judges whether transmission of the count instruction is successful. When the transmission is successful, the process proceeds to step S71, and when the transmission is not successful, the process goes back to step S68. In step S71, CPU 201 subtracts the number "1" from the transmission counter. This is because the transmission counter counts the number of untransmitted count instructions. The count instructions are transmitted to the designated printer MFP 100 until the value of the transmission counter is zero. This enables the designated printer to make count 121 a reliable value for calculating the charge.

Figure 12:
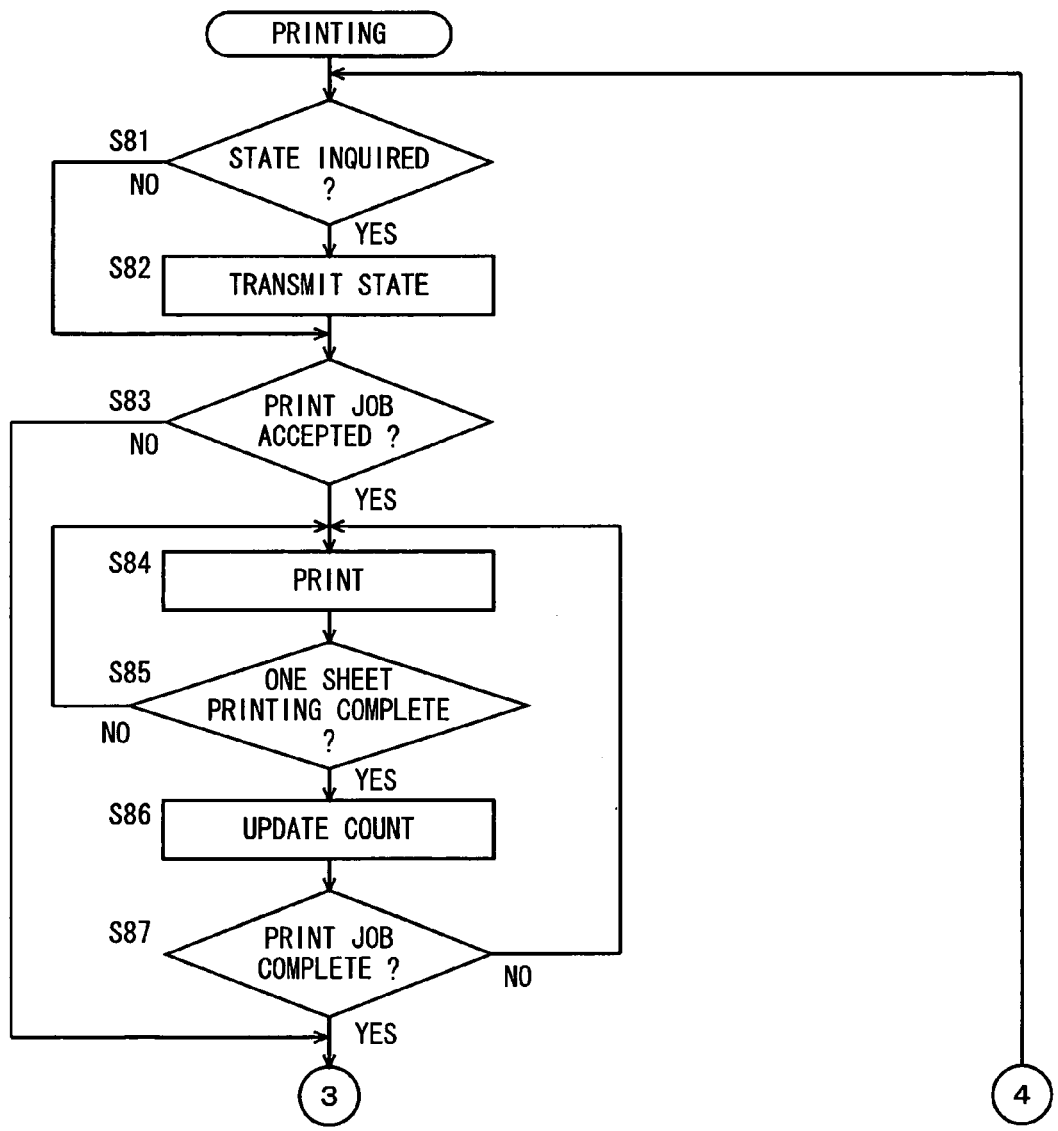
FIG. 12 is a first flowchart showing an example of the flow of a print process according to the second embodiment.
Figure 13:
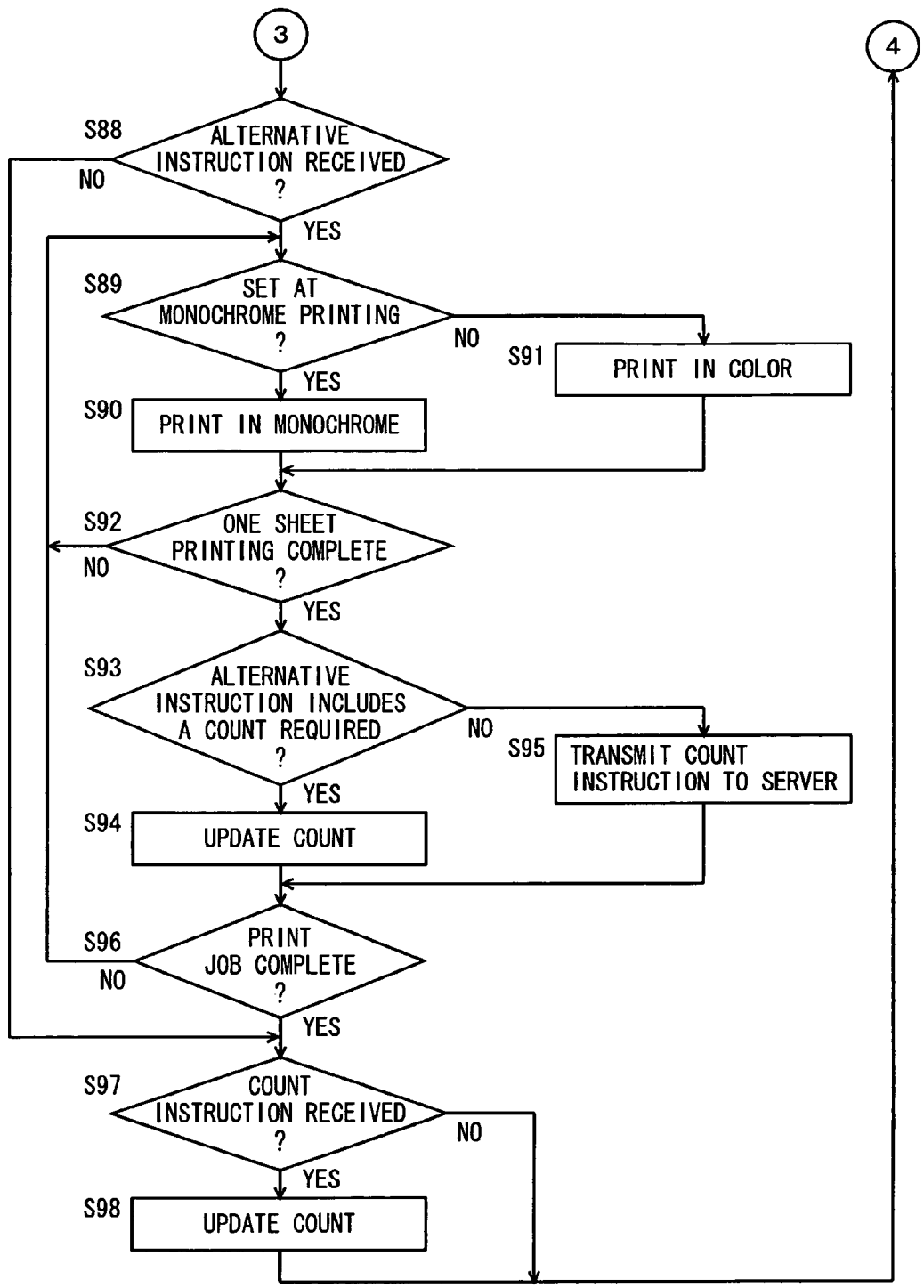
FIG. 13 is a second flowchart showing an example of the flow of a print process according to the second embodiment.

FIGS. 12 and 13 are flowcharts showing examples of the flow of a print process according to the second embodiment. The print process is executed by each of MFPs 100, 100A, 100B, 100C, and printer 300. Here the case where the designated printer MFP 100 or the alternative printer MFP 100A executes the print process will be exemplified. The print process is executed at CPU 111 of MFP 100 or CPU 111A of MFP 100A by executing a program for counting the number of sheets printed. Here CPU 111 of MFP 100 will be taken as an example for executing steps S81 through S87 and steps S97 and S98, and CPU 111A of MFP 100A will be taken as an example for executing steps S88 through S96. Referring to FIGS. 12 and 13, CPU 111 judges whether there is a state inquiry from print server 400 (step S81). Specifically, CPU 111 judges whether a transmission demand for an MIB is received. When there is a state inquiry, the process proceeds to step S82, and otherwise, the process proceeds to step S83. In step S82, CPU 111 transmits to print server 400 state-indicating information, which is, here, the MIB.

In step S83, CPU 111 judges whether the print job is accepted from print server 400. When the print job is accepted, the process proceeds to step S84, and otherwise, the process proceeds to step S88.

In step S84, CPU 111 executes the print job. Specifically, CPU 111 carries out printing based on print data included in the print job according to print conditions. CPU 111 then judges whether printing of one sheet is complete (step S85). When printing of one sheet is not yet complete, the process goes back to step S84, and when printing of one sheet is complete, the process proceeds to step S86. When, however, a trouble occurs and printing is thereby impossible, the process proceeds to step S88. In step S86, CPU 111 updates count 121 by adding thereto the number "1", which denotes that the number of sheets printed is one. Since count 121 is updated only when printing of one sheet is complete, count 121 is not updated when printing is disabled by a trouble or the like before completion of the printing, thereby enabling it to properly count the number of sheets printed which serves as the basis on which a charge is calculated.

In step S87, CPU 111 judges whether printing of the print job is complete. Specifically, CPU 111 judges for completion of printing of all the print data included in the print job and of printing of the number of sheets specified as a print condition. When printing of the print job is complete, the process proceeds to step S88, and otherwise, the process goes back to step S84 for execution of next printing.

In step S88, CPU 111A judges whether MFP 100A receives an alternative instruction. When the alternative instruction is received, the process proceeds to step S89, and otherwise, the process proceeds to S97. In step S89, CPU 111A judges whether print conditions in the print job included in the received alternative instruction include monochrome printing. When there is a monochrome printing condition, the process proceeds to step S90, and otherwise, the process proceeds to step S91. In step S90, CPU 111A carries out monochrome printing, and the process proceeds to step S92. When the designated printer is a monochrome-dedicated printer and the alternative printer is capable of color printing, then monochrome printing is compulsively carried out, in order to preclude the malicious attempt to enjoy color printing at monochrome printing rates. In step S91, CPU 111A carries out color printing, and the process proceeds to step S92.

In step S92, CPU 111A judges whether printing of one sheet is complete. When printing of one sheet is not yet complete, the process proceeds to step S89, and the process proceeds to step S93 upon completion of printing of one sheet. When, however, a trouble occurs and printing is thereby impossible, the process proceeds to step S97.

In step S93, CPU 111A judges whether the alternative instruction is set at "count required". When the alternative instruction is set at "count required", the process proceeds to step S94, and otherwise, the process proceeds to step S95. In step S95, CPU 111A transmits a count instruction to print server 400, and the process proceeds to step S96.

In step S94, CPU 111A updates count 121 by adding thereto the number "1", which denotes that the number of sheets printed is one. Then the process proceeds to step S96. Since count 121 is updated only when printing of one sheet is complete, count 121 is not updated when printing is disabled by a trouble or the like before completion of the printing, thereby enabling it to properly count the number of sheets printed which serves as the basis on which a charge is calculated.

In step S96, CPU 111A judges whether printing of the print job is complete. Specifically, CPU 111A judges for completion of printing of all the print data included in the print job and of printing of the number of sheets specified as a print condition. When printing of the print job is complete, the process proceeds to step S97, and otherwise, the process goes back to step S89 for execution of next printing.

In step S97, CPU 111 judges whether the count instruction is received. When the count instruction is received, the process proceeds to step S98, and otherwise, the process goes back to step S81. In step S98, CPU 111 updates count 121 by adding thereto the number "1", which denotes that the number of sheets printed by the alternative printer is one. Then the process goes back to step S81. Since count 121 is updated only when printing of one sheet by the alternative printer is complete, count 121 is not updated when printing is disabled by a trouble or the like before completion of the printing at the alternative printer, thereby enabling it to properly count the number of sheets printed which serves as the basis on which a charge is calculated.

In the second embodiment, MFPs 100, 100A, 100B, and 100C execute the charge calculating process shown in FIG. 6.

As has been described hereinbefore, in print system 1A according to this embodiment, when print server 400 accepts a print job from PC 200 and the designated printer MFP 100 is not available for executing the print job, then print server 400 transmits an alternative instruction including the print job to the alternative printer MFP 100A, and transmits to the designated printer MFP 100 a count instruction upon every printing of one sheet by the alternative printer MFP 100A based on the print job included in the alternative instruction. The designated printer MFP 100, upon receipt of the count instruction, updates count 121 by adding the number of sheets (number of alternative sheets) printed by the alternative printer MFP 100A based on the print job included in the alternative instruction to the number of sheets (count 121) printed by the designated printer MFP 100 itself. Since the charge is calculated based on the number of sheets printed, when the charge is calculated, even the highest unit charge is one specified in the familiar MFP 100, irrespective of the unit charge of the alternative printer MFP 100A. This prevents charging of a higher amount of money than the user expected.

While in the above embodiments description has been made of print systems 1 and 1A, it will be readily appreciated that the present invention can also be taken as such a method for counting the number of sheets printed that executes the processes shown in FIGS. 4 to 6 and 10 to 13, or as such a program for counting the number of sheets printed that is embodied on a computer readable medium and causes a computer to execute the processes shown in FIGS. 4 to 6 and 10 to 13.

Third Embodiment

A print system according to a third embodiment has the same schematic diagram as that of print system 1 according to the first embodiment, which is shown in FIG. 1.

MFPs 100, 100A, 100B, and 100C are image forming apparatuses against which an amount of money is charged for printing, while printer 300 is an image forming apparatus against which an amount of money is not charged for printing. The hardware structure of printer 300 is known in the art and therefore will not be repeated. MFPs 100, 100A, 100B, and 100C have the same structures and functions, and therefore MFP 100 will be taken as an example here unless stated otherwise.

The hardware structure of each of MFPs 100, 100A, 100B, and 100C in the third embodiment is the same as the hardware structure of MFP 100 in the first embodiment shown in FIG. 2, and therefore will not be repeated.

CPU 111 can be activated independently of ADF 10, image reading portion 20, image forming portion 30, paper feeding portion 40, and post-processing portion 50. Thus, even when an error or trouble causes to discontinue operation of ADF 10, image reading portion 20, image forming portion 30, paper feeding portion 40, and post-processing portion 50, CPU 111 is able to communicate with PC 200 and the other MFPs 100A, 100B, and 100C, and printer 300 via data communication control portion 117.

For simplicity of description, the case where PC 200 transmits a print job to MFP 100 when printing is impossible at MFP 100 because of a trouble will be exemplified. In this case, the print job transmitted from PC 200 is executed at printer 300, which is an alternative printer for MFP 100. MFP 100 is the apparatus designated for execution of the print job by the user through PC 200. The apparatus, such as MFP 100, that the user has designated for execution of the print job will be referred to as a designated printer. The apparatus, such as printer 300, that executes the print job in place of the designated printer will be referred to as an alternative printer.

FIG. 14 is a functional block diagram schematically showing the functions of a print system according to the third embodiment. FIG. 14 shows the functions of CPU 111 of MFP 100 acting as a designated printer and functions of CPU 301 of printer 300 acting as an alternative printer. Also shown are an EEPROM 113 and an EEPROM 303 connected to MFP 100 and printer 303, respectively.

Referring to FIG. 14, CPU 111 of MFP 100, which is a designated printer, includes a job accepting portion 51 to accept a job, job executing portion 53 to execute the job, a requesting portion 55 to make a request for execution of the job to the alternative printer, a count instruction receiving portion 57 to receive a count instruction from the alternative printer, and a charge calculating portion 61A to calculate a charge.

Job accepting portion 51 accepts a print job transmitted from PC 200. When PC 200 transmits the print job to MFP 100, data communication control portion 117 receives the print job. It is the print job received by data communication control portion 117 that job accepting portion 51 accepts. Along with the print job, data communication control portion 117 receives apparatus identification information for identifying PC 200, and job accepting portion 51 accepts the apparatus identification information along with the print data. The apparatus identification information is location information of PC 200 on network 2. The apparatus identification information received along with the print data is transmitting source information for identifying the transmitting source of the print job. While description is made of receiving the transmitting source information and the print job as separate items, the print job may contain the transmitting source information. Job accepting portion 51 outputs the print job to job executing portion 53 and to requesting portion 55.

Job executing portion 53, upon input of the print job from job accepting portion 51, controls image forming apparatus 30 to have print data included in the print job printed according to print conditions. During causing image forming apparatus 30 to carry out printing based on the print job, job executing portion 53 updates a count 121 stored in a predetermined area of EEPROM 113 upon every printing of one sheet of paper by image forming apparatus 30. The update is carried out by adding "1", which denotes that the number of sheets printed is one, to the count 121. While description is made to providing a single area in EEPROM 113 for count 121, a plurality of count areas may be provided in EEPROM 113 each corresponding to a different unit charge that serves a basis on which a charge is levied. For example, there may be two count areas to correspond to full color printing and monochrome printing. While image forming apparatus 30 updates count 121 upon completion of printing of one sheet, the update may be carried out upon completion of the print job, where image forming apparatus 30 adds the number of sheets printed to the count 121.

When MFP 100 has a trouble, job executing portion 53 temporarily stores the print job in EEPROM 113 or destroys the print job, instead of causing image forming apparatus 30 to form an image based on the print job. When stored in EEPROM 113, the print job is preferably provided with a flag indicating that no printing was carried out for the print job, thereby distinguishing the print job from printed print jobs.

Requesting portion 55 accepts input of the print job from job accepting portion 51. When MFP 100 has a trouble and printing is thereby impossible at image forming apparatus 30, then requesting portion 55 transmits the print job to printer 300, which is the alternative printer. As information for specifying the alternative printer, the apparatus identification information of printer 300 may be stored in EEPROM 113 in advance. The apparatus identification information is location information of printer 300 on network 2. The alternative printer may be determined arbitrarily from among the group of MFPs 100A, 100B, 100C, and printer 300. Alternatively, it is possible to make an inquiry to network 2 by broadcast and to choose one of the responding apparatuses as the alternative printer.

CPU 301 of printer 300, which is the alternative printer, includes a job receiving portion 71A to receive a print job, a job executing portion 73A to execute the print job, and a count instruction transmitting portion 75 to transmit a count instruction. EEPROM 303 of printer 300 has an area for storing transmission counter 127 for counting the number of count instructions that fail to be transmitted.

Job receiving portion 71A receives the print job from MFP 100, which is the designated printer. When MFP 100 transmits the print job, job receiving portion 71A receives the print job. Along with the print job, job receiving portion 71A receives apparatus identification information for identifying MFP 100. The apparatus identification information is an IP address allotted to MFP 100. The apparatus identification information received along with the print job is information for specifying the transmitting source of the alternative instruction. This enables the alternative printer 300 to specify the designated printer MFP 100 and to transmit to the designated printer a count instruction, described later. Job receiving portion 71A outputs the print job to job executing portion 73A.

Job executing portion 73A, upon input of the print job from job receiving portion 71A, controls image forming portion 30 to execute print data included in the print job according to print conditions.

Job executing portion 73A outputs a print completion signal to count instruction transmitting portion 75 upon every completion of printing of one sheet by image forming portion 30 based on the print job. That is, job executing portion 73A outputs to count instruction transmitting portion 75 as many print completion signals as the number of sheets printed by image forming portion 30 during execution of the print job. Output of the print completion signal after completion of printing of one sheet is for the purpose of preventing erroneous charging for discontinued printing when image forming portion 30 fails because of an error or trouble before completion of the printing. Job executing portion 73A may output to count instruction transmitting portion 75 a print completion signal including the number of sheets printed upon completion of printing of all the intended number of sheets by image forming portion 30 based on the print job.

Count instruction transmitting portion 75 transmits a count instruction to the designated printer MFP 100, which has transmitted the alternative instruction, upon every input of the print completion signal from job executing portion 73A. The count instruction therefore denotes completion of printing of one sheet by the alternative printer 300. When transmission of the count instruction is unsuccessful, count instruction transmitting portion 75 updates transmission counter 127 stored in EEPROM 303 by adding the number "1" to transmission counter 127. Count instruction transmitting portion 75 transmits as many count instructions as the count of counter 127 until transmission of all these count instructions is successful. This is to secure transmission of the count instruction to the designated printer MFP 100. When the print completion signal output from job executing portion 73A includes the number of sheets printed, then count instruction transmitting portion 75 transmits a count instruction including the number of sheets printed (number of alternative sheets) to the designated printer MFP 100.

In CPU 111 of the designated printer MFP 100, count instruction receiving portion 57 receives the count instruction from the alternative printer 300. Upon transmission of the count instruction by printer 300, data communication control portion 117 receives the count instruction. It is the count instruction received by data communication control portion 117 that count instruction receiving portion 57 accepts. Count instruction receiving portion 57, upon reception of the count instruction, outputs the count instruction to charge calculating portion 61A.

Charge calculating portion 61A includes an alternative counting portion 67 and a unit charge determining portion 65. Alternative counting portion 67 accepts input of the count instruction from count instruction receiving portion 57. Since the count instruction denotes completion of printing of one sheet by the alternative printer 300, alternative counting portion 67 updates an alternative count 125, which is included in EEPROM 113, by adding to alternative count 125 the number "1", which denotes that the number of sheets printed by the alternative printer 300 is one. When the count instruction includes the number of alternative sheets, then alternative counting portion 67 updates alternative count 125, which is included in EEPROM 113, by adding to alternative count 125 the number of alternative sheets, which are printed by the alternative printer 300.

Charge calculating portion 61A calculates the charge using count 121 and alternative count 125 and a unit charge determined by unit charge table 123. Unit charge table 123 includes records that specify unit charges each corresponding to a particular number of sheets printed. The records are stored in EEPROM 113 in advance. Here the unit charge table includes a record that specifies 9 yens as a unit charge per sheet for 0 to 500 sheets printed, a record that specifies 8 yens as a unit charge per sheet for 501 to 1000 sheets printed, a record that specifies 7 yens as a unit charge per sheet for 1001 to 3000 sheets printed, and a record that specifies 6 yens as a unit charge per sheet for equal to or more than 3001 sheets printed.

Unit charge determining portion 65 obtains a reference value by adding count 121 and alternative value 125, and determines as the unit charge for charge calculation a unit charge in the unit charge table that corresponds to the reference value. Charge calculating portion 61A calculates a charge corresponding to the number of sheets printed by multiplying count 121 by the unit charge determined by unit charge determining portion 65. For example, when count 121 is 2900 and alternative count 125 is 200, then the unit charge corresponding to the added count 3100 is 6 yens and the charge calculated based on the count 2900 is 17400 yens.

It is possible to set 4500 yens for 500 sheets, which is in the first number range, as the minimum charge. In this case, the charge is 4500 yens for all the cases where count 121 is less than 500.

It is possible for MFP 100 to act as an alternative printer. Thus, count 121, which is stored in EEPROM 113, has added therein the number of sheets printed based on a print job included in an alternative instruction received from the designated printer.

Figure 15:
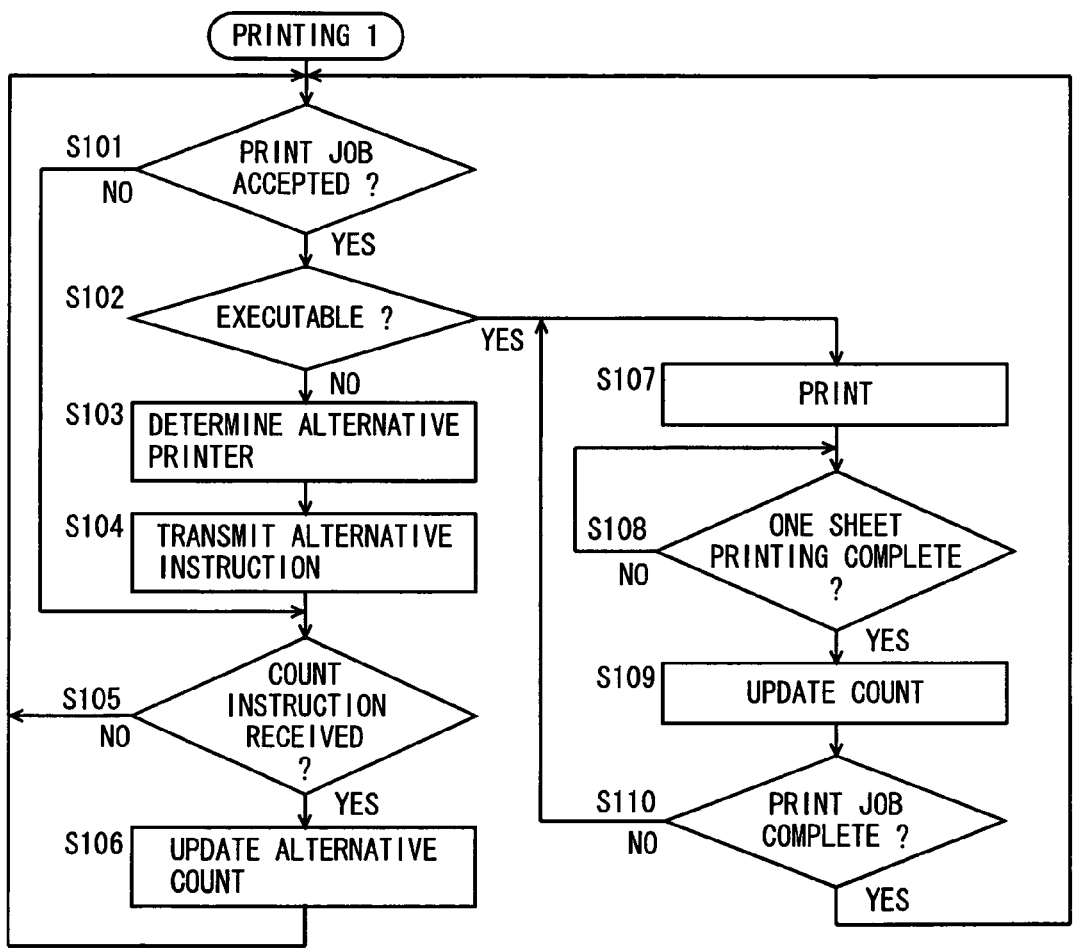
FIG. 15 is a flowchart showing an example of the flow of a print process executed by a designated printer according to the third embodiment.

FIG. 15 is a flowchart showing an example of the flow of a print process executed by the designated printer. The print process is executed by a designated printer among MFPs 100, 100A, 100B, and 100C, against which a charge is levied. Here MFP 100 is taken as an example of the designated printer. The print process is executed by CPU 111 of the designated printer MFP 100 by executing a program for counting the number of sheets printed. Referring to FIG. 15, CPU 111 judges whether MFP 100 accepts a print jog (step S101). When the print job is accepted, the process proceeds to step S102, and otherwise, the process proceeds to S105. In step S105, CPU 111 judges whether MFP 100 accepts a count instruction. When the count instruction is accepted, the process proceeds to step S106, and otherwise, the process goes back to step S101. That is, the print process is executed when CPU 111 accepts the print job or the count instruction.

When MFP 100 accepts the print job in step S101, the process proceeds to step S102. Here description will be made of the print job being transmitted from PC 200. The process may proceed to step S102 upon receipt of a copy job instead of the print job. In the case of the copy job, CPU 111 causes image forming portion 30 to carry out printing based on image data resulting from reading of text by image reading portion 20. There may be such a trouble that image forming portion 30 cannot be activated while image reading portion 20 can. In this case, an alternative printer may be caused to execute a print job specifying that the alternative printer print the image data output from image reading portion 20.

In step S102, CPU 111 judges whether MFP 100 is available for executing the print job. When MFP 100 is available for executing the print job, the process proceeds to step S107, and when MFP 100 is not available for executing the print job, the process proceeds to step S103. For example, MFP 100 is judged to be unavailable for executing the print job when a trouble is detected which makes image forming impossible, and judged to be available when no trouble is detected. That is, the state of suspense because of an error is encompassed by the state of being available for printing.

In step S107, CPU 111 executes the print job. Specifically, CPU 111 carries out printing based on print data included in the print job according to print conditions. CPU 111 then judges whether printing of one sheet is complete (step S108). The process turns into a stand-by state until completion of printing of one sheet, and proceeds to step S109 upon completion of printing of one sheet. When, however, a trouble occurs and printing is thereby impossible, the process is terminated. In step S109, CPU 111 updates count 121 by adding thereto the number "1", which denotes that the number of sheets printed is one. Since count 121 is updated only when printing of one sheet is complete, count 121 is not updated when printing is disabled by a trouble or the like before completion of the printing, thereby enabling it to properly count the number of sheets printed which serves as the basis on which a charge is calculated.

In step S110, CPU 111 judges whether printing of the print job is complete. Specifically, CPU 111 judges for completion of printing of all the print data included in the print job and of printing of the number of sheets specified as a print condition. When printing of the print job is complete, the process goes back to step S101, and otherwise, the process goes back to step S107 for execution of next printing.

In step S103, CPU 111 determines an alternative printer. Here CPU 111 determines printer 300 as the alternative printer by reading from EEPROM 113 alternative printer information denoting that printer 300 is the alternative printer.

CPU 111 then transmits an alternative instruction to the alternative printer (step S104). The alternative instruction includes the print job accepted in step S101. This secures execution of the print job by the alternative printer when a trouble prevents printing, thereby enabling immediate execution of the print job. After transmitting the alternative instruction, CPU 111 informs PC 200 that the printing is carried out by the alternative printer. Thus, the user of PC 200, who has designated MFP 100 and input an instruction that the print job be transmitted to MFP 100, is able to know that the print job is printed by the alternative printer 300. Thus, the user knows that he/she needs to go to printer 300, not MFP 100, to fetch the printed sheets, since printer 300 actually brings out the printed sheets.

In step S105, CPU 111 judges whether MFP 100 accepts the count instruction. When the count instruction is accepted, the process proceeds to step S106. In step S106, CPU 111 updates alternative count 125 by adding thereto the number "1", which denotes that the number of times the count instruction is received is one. Then, the process goes back to step S101. The count instruction is transmitted to the designated printer MFP 100 from the alternative printer 300 upon every completion of printing of one sheet by printer 300. Thus, the count instruction denotes that the alternative printer 300 has completed printing of one sheet. Since alternative count 125 is updated only when the alternative printer 300 completes printing of one sheet, alternative count 125 is not updated when printing is disabled by a trouble or the like before completion of the printing at printer 300.

Figure 16:
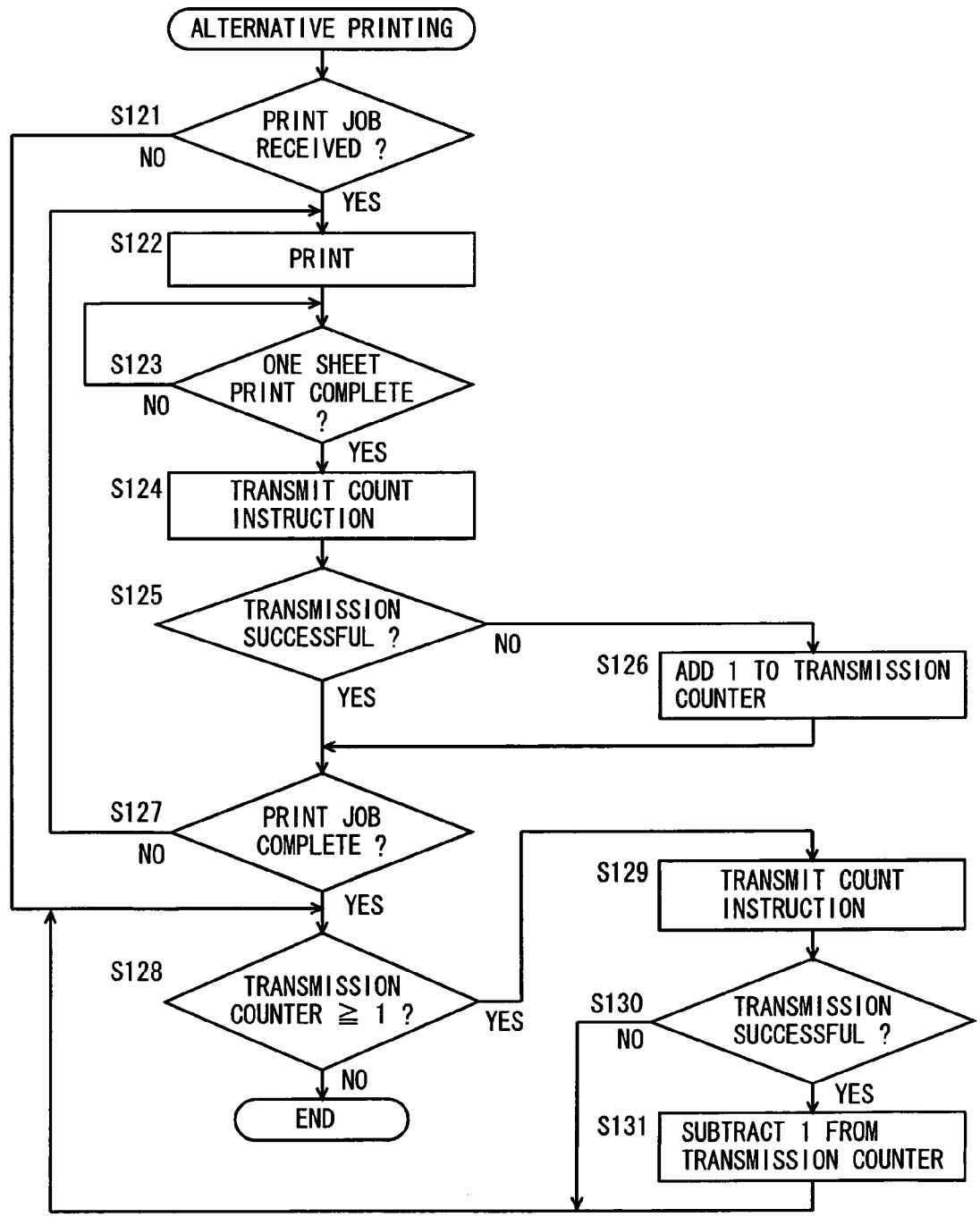
FIG. 16 is a flowchart showing an example of the flow of an alternative print process according to the third embodiment.

FIG. 16 is a flowchart showing an example of the flow of an alternative print process. The alternative print process is executed when printer 300, which is not charged for printing, acts as an alternative printer. The alternative print process is executed by CPU 301 of the alternative printer 300 by executing a program for counting the number of sheets printed. Referring to FIG. 16, CPU 301 judges whether printer 300 receives a print job (step S121). When the print job is received, the process proceeds to step S122, and otherwise, the process proceeds to S132.

In step S122, CPU 301 carries out printing, and the process proceeds to step S123. In step S123, CPU 301 judges whether printing of one sheet is complete. The process turns into a stand-by state until completion of printing of one sheet, and proceeds to step S124 upon completion of printing of one sheet. When, however, a trouble occurs and printing is thereby impossible, the process is terminated. In step S124, CPU 301 transmits a count instruction to the designated printer, which is the transmitting source.

In step S125, CPU 301 judges whether transmission of the count instruction is successful. When the transmission is successful, the process proceeds to step S127. When the transmission is not successful, the number "1" is added to a transmission counter (step S126), after which the process proceeds to step S127. The transmission counter counts the number of untransmitted count instructions resulting from unsuccessful transmission. Since the count instruction denotes that the alternative printer has printed one sheet of paper, the transmission counter denotes the number of sheets, among the number of sheets printed by the alternative printer, that is yet to be counted for calculating the charge at the designated printer.

In step S127, CPU 301 judges whether printing of the print job is complete. Specifically, CPU 301 judges for completion of printing of all the print data included in the print job and of printing of the number of sheets specified as a print condition. When printing of the print job is complete, the process proceeds to step S128, and otherwise, the process goes back to step S123 for execution of next printing.

In step S128, CPU 301 judges whether the transmission counter denotes a value of more than one. When the value is more than one, the process proceeds to step S129, and otherwise, the process is terminated. In step S129, CPU 301 transmits the count instruction to the designated printer, which is the transmitting source. In step S130, CPU 301 judges whether transmission of the count instruction is successful. When the transmission is successful, the process proceeds to step S131, and when the transmission is not successful, the process goes back to step S128. In step S131, CPU 301 subtracts the number "1" from the transmission counter. This is because the transmission counter counts the number of untransmitted count instructions. The count instructions are transmitted to the designated printer until the value of the transmission counter is zero. This enables the designated printer to make alternative count 125 a reliable value for calculating the charge.

FIG. 17 is a flowchart showing an example of the flow of a charge calculating process. The charge calculating process is executed by MFPs 100, 100A, 100B, and 100C. Here CPU 111 of MFP 100 will be taken as an example for executing the charge calculating process. The charge calculating process is executed at CPU 111 of MFP 100 by executing a program for counting the number of sheets printed.

Referring to FIG. 17, CPU 111 judges whether today is a proper time for calculating the charge (step S141). The time for calculating the charge is stored in EEPROM 113 in advance, preferably a predetermined date such as the end of the month. The process turns into a stand-by state until the time for calculating the charge comes, and proceeds to step S142 when the time for calculating the charge comes. That is, the charge calculating process is executed only when the time for calculating the charge comes.

CPU 111 then reads unit charge table 123 from EEPROM 113 (step S142), and reads count 121 from EEPROM 113 (step S143) and alternative count 125 from EEPROM 113 (step S144). CPU 111 then calculates a reference value by adding count 121 and alternative count 125 (step S145), and determines a unit charge using the reference value (step S146). Specifically, CPU 111 determines a unit charge in unit charge table 123 that corresponds to the reference value. CPU 111 then calculates the charge (step S147). Specifically, CPU 111 calculates a charge corresponding to the number of sheets printed by multiplying count 121 by the determined unit charge. For example, when count 121 is 2900 and alternative count 125 is 200, then the unit charge corresponding to the added count 3100 is 6 yens and the charge calculated based on the count 2900 is 17400 yens.

CPU 111 then transmits the calculated charge to a predetermined destination (step S148). The destination is, for example, the server that controls MFP 100. The transmission may be carried out through LAN 2 or by mobile phone. Alternatively, the calculated charge may not be transmitted but stored in EEPROM 113 of MFP 100.

As has been described hereinbefore, in print system 1 according to this embodiment, when the designated printer MFP 100 accepts a print job and is available for executing the print job, then MFP 100 carries out printing based on the print job and counts the number of sheets printed. When the designated printer MFP 100 is not available for executing the print job, MFP 100 transmits an alternative instruction including the print job to the alternative printer 300 and counts the number of alternative sheets, which are printed by the alternative printer based on the print job included in the alternative instruction. Thus, when the alternative printer is of the type that a charge is not levied against, the number of alternative sheets is not incorporated into calculation, thereby enabling calculation of a proper charge.

Also, since the unit charge per one sheet of paper printed is determined based on the number of sheets (count 121) printed by the designated printer MFP 100 and on the number of sheets (alternative count 125) printed by the alternative printer 300, the resulting unit charge is one that considers the user's intention.

Fourth Embodiment

Figure 18:
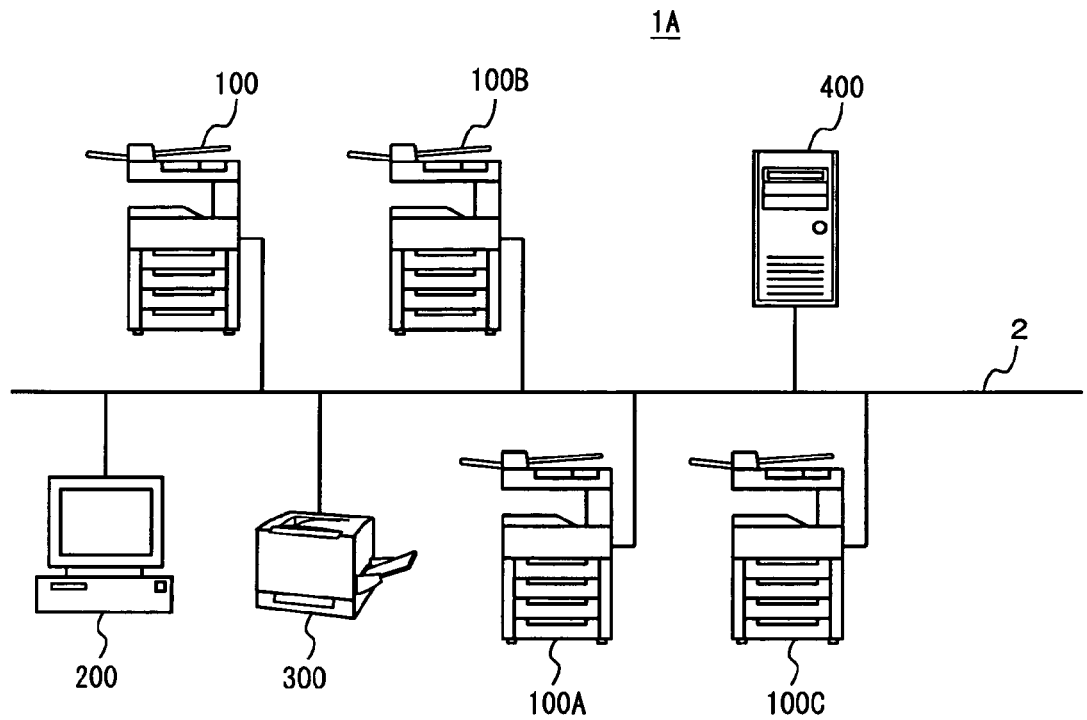
FIG. 18 is a schematic diagram of a print system according to a fourth embodiment of the present invention.

A print system according to a fourth embodiment will be described. FIG. 18 is a schematic diagram of a print system according to the fourth embodiment. Referring to FIG. 18, a print system 1A according to the fourth embodiment includes MFPs 100, 100A, 100B, 100C, a PC 200, a printer 300, and a print server 400 each connected to a network 2.

MFPs 100, 100A, 100B, and 100C are image forming apparatuses against which an amount of money is charged for printing, while printer 300 is an image forming apparatus against which an amount of money is not charged for printing. MFPs 100, 100A, 100B, and 100C have the same structures and functions, and therefore MFP 100 will be taken as an example here unless stated otherwise.

In print system 1A according to the fourth embodiment, a print job is first transmitted from PC 200 to print server 400, which controls the print job. For simplicity of description, the case where PC 200 transmits to MFP 100 a print job designating MFP 100 when printing is impossible at MFP 100 because of a trouble will be exemplified. Also the case where printer 300 is set in print server 400 as an alternative printer for MFP 100 will be exemplified. In this case, MFP 100 is the designated printer and printer 300 is the alternative printer. Thus, in print system 1A according to the fourth embodiment, printer server 400 assumes some of the functions possessed by the designated printer MFP 100 and the alternative printer 300 in print system 1 according to the third embodiment. Description will be made mainly of differences relative to the third embodiment.

Figure 19:
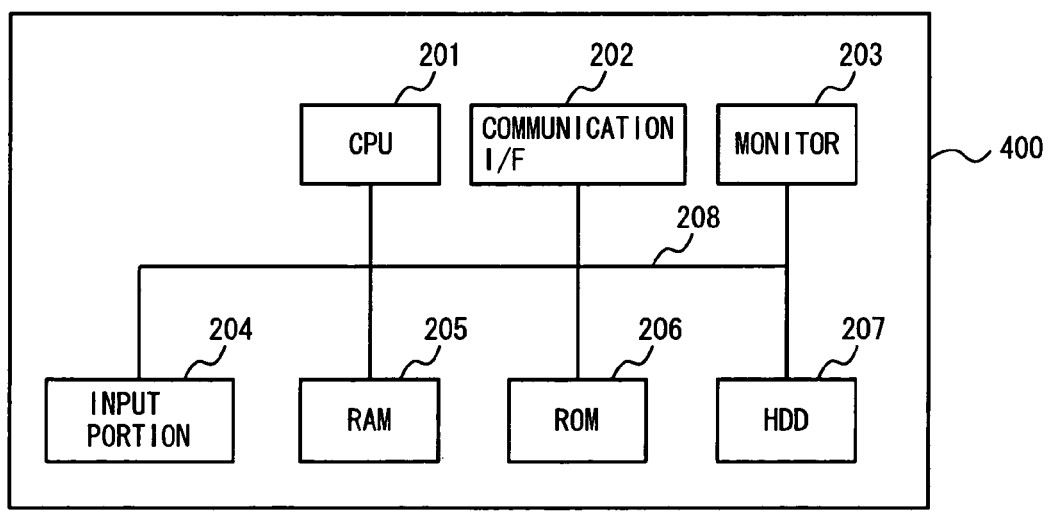
FIG. 19 is a diagram showing an example of the hardware structure of a print server according to the fourth embodiment.

FIG. 19 is a diagram showing an example of the hardware structure of the print server. Referring to FIG. 19, print server 400 includes a CPU 201, a RAM 205 used as a working area for CPU 201, a ROM 206 that stores a program or the like to be executed at CPU 201, a hard disk drive (HDD) 207, a communication I/F 202 for connecting print server 400 to network 2, an input portion 204 such as a keyboard and a mouse, and a monitor 203, each connected to bus 208.

Figure 20:
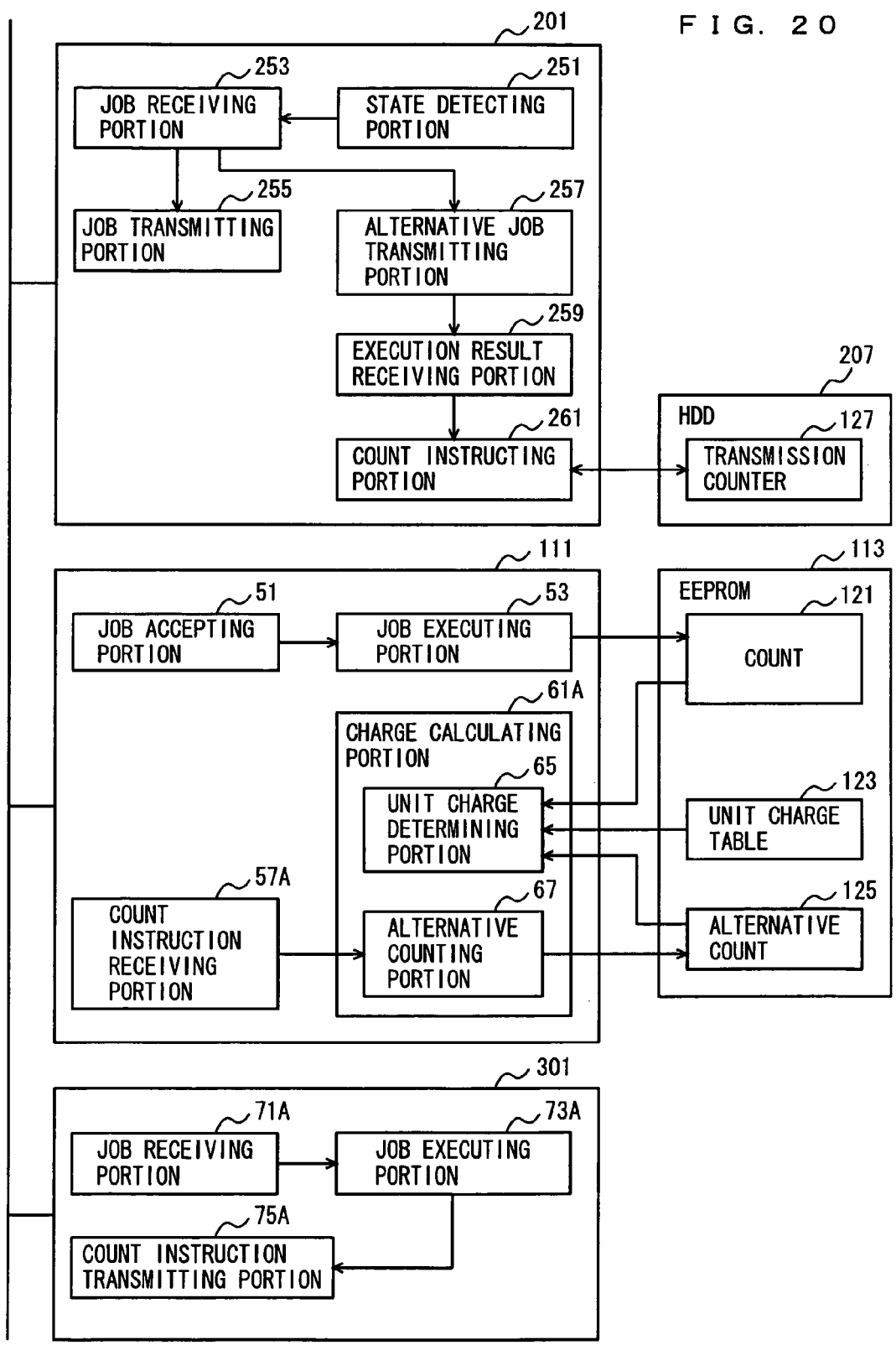
FIG. 20 is a functional block diagram schematically showing the functions of a print system according to the fourth embodiment.

FIG. 20 is a functional block diagram schematically showing the functions of the print system according to the fourth embodiment. Here MFP 100 is taken as an example of the designated printer and printer 300 as the alternative printer for MFP 100. FIG. 20 shows the functions of CPU 201 of print server 400, information stored in HDD 207, the functions of CPU 111 of MFP 100 when acting as the designated printer, and the functions of CPU 301 of printer 300 when acting as the alternative printer.

Referring to FIG. 20, CPU 201 of print server 400 includes a state detecting portion 251 to detect the state of the apparatuses to be controlled by print server 400, a job receiving portion 253 to receive a print job, a job transmitting portion 255 to transmit the print job to the designated printer, an alternative job transmitting portion 257 to transmit the print job to the alternative printer, an execution result receiving portion 259 to receive an execution result from the alternative printer, and a count instructing portion 261 to instruct the designated printer to carry out counting. HDD 207 stores a transmission counter 127.

CPU 111 of MFP 100 differs from the FIG. 14 embodiment in that there is no requesting portion 55 and that a count instruction receiving portion 57A has a change in count instruction receiving portion 57. The rest of the functions are the same. CPU 301 of printer 300 differs from the FIG. 14 embodiment in that a count instruction transmitting portion 75A has a change in count instruction transmitting portion 75, and that EEPROM 303 does not store transmission counter 127. The rest of the functions are the same.

State detecting portion 251 detects the state of the apparatuses to be controlled by print server 400. The apparatuses to be controlled here are MFPs 100, 100A, 100B, 100C, and printer 300. State detecting portion 251 detects the states of MFPs 100, 100A, 100B, 100C, and printer 300 by, for example, acquiring from MFPs 100, 100A, 100B, 100C, and printer 300 an MIB (Management Information Base).

Job receiving portion 253 receives the print job transmitted from PC 200. When PC 200 transmits to print server 400 a print job that designates MFP 100 as the designated printer, then communication I/F 202 receives the print job. It is the print job received by communication I/F 202 that job receiving portion 253 accepts. In addition to the print job, communication I/F 202 receives apparatus identification information for identifying PC 200. The apparatus identification information is transmitting source information for specifying the transmitting source of the print job. While the case of receiving the transmitting source information and the print job as separate items is exemplified, the print job may include the transmitting source information. Job receiving portion 253 transmits the print job to job transmitting portion 255 or to alternative job transmitting portion 257.

Job receiving portion 253 judges whether the designated printer is available for printing. Specifically, job receiving portion 253 judges the state of MFP 100, which is designated as the designated printer by the received print job. The availability for printing encompasses all but the case where MFP 10 is suspended because of a trouble and therefore unavailable for printing. For example, the state of suspense because of an error is encompassed by the state of being available. When the designated printer MFP 100 is available for printing, job receiving portion 253 outputs the print job to job transmitting portion 255. When the designated printer MFP 100 is not available for printing, job receiving portion 253 outputs the print job to alternative job transmitting portion 257.

Job transmitting portion 255 transmits the print job input from job receiving portion 253 to the designated printer MFP 100. The printed job transmitted by job transmitting portion 255 is received by job accepting portion 51 and executed by job executing portion 53 of the designated printer MFP 100. This causes count 121 to be updated by addition thereto of the number of sheets printed by job executing portion 53 based on the print job.

Alternative job transmitting portion 257 transmits, to the alternative printer for the designated printer, an alternative instruction including the print job input from job receiving portion 253. Here the apparatus attribute of printer 300, which includes information for specifying the alternative printer for MFP 100, may be stored in HDD 207 in advance. The alternative printer for the designated printer MFP 100 may be determined arbitrarily from among the group of MFPs 100A, 100B, 100C, and printer 300. Alternatively, it is possible to make an inquiry to network 2 by broadcast and to choose one of responding apparatuses as the alternative printer.

The alternative instruction transmitted from alternative job transmitting portion 257 is received by an alternative instruction receiving portion 71A and executed by an alternative job executing portion 73A of the alternative printer 300. Count instruction transmitting portion 75A transmits to print server 400 as many number of count instructions as the number of sheets printed by alternative job executing portion 73 based on the print job.

Execution result receiving portion 259 of print server 400 receives the count instruction from the alternative printer 300. Count instructing portion 261 transmits a count instruction to the designated printer MFP 100 every time execution result receiving portion 259 receives the count instruction. When the designated printer MFP 100 does not receive the count instruction, count instructing portion 261 adds the number "1" to transmission counter 127 in HDD 207 in order to store the number of untransmitted count instructions. Count instructing portion 261 then subtracts the number "1" from transmission counter 127 upon every transmission of one untransmitted count instruction, and repeats transmission of the count instruction until the value of transmission counter 127 is zero. This secures transmission of the count instruction to the designated printer MFP 100.

The count instruction transmitted from count instructing portion 261 is received by count instruction receiving portion 57A of the designated printer MFP 100. The count instruction received by count instruction receiving portion 57A is output to an alternative counting portion 67 of a charge calculating portion 61A. Alternative counting portion 67 adds the number "1", which denotes that the number of sheets printed by the alternative printer 300 is one, to the alternative count 125 stored in EEPROM 113, thereby updating alternative count 125. When the count instruction includes the number of alternative sheets, which are printed by the alternative printer 300, then alternative counting portion 67 updates alternative count 125, which is stored in EEPROM 113, by adding to the alternative count 125 the number of alternative sheets, which are printed by the alternative printer 300.

It is possible for MFP 100 to act as an alternative printer. Thus, count 121, which is stored in EEPROM 113, has added therein the number of sheets printed based on a print job included in an alternative instruction received from the designated printer.

Figure 21:
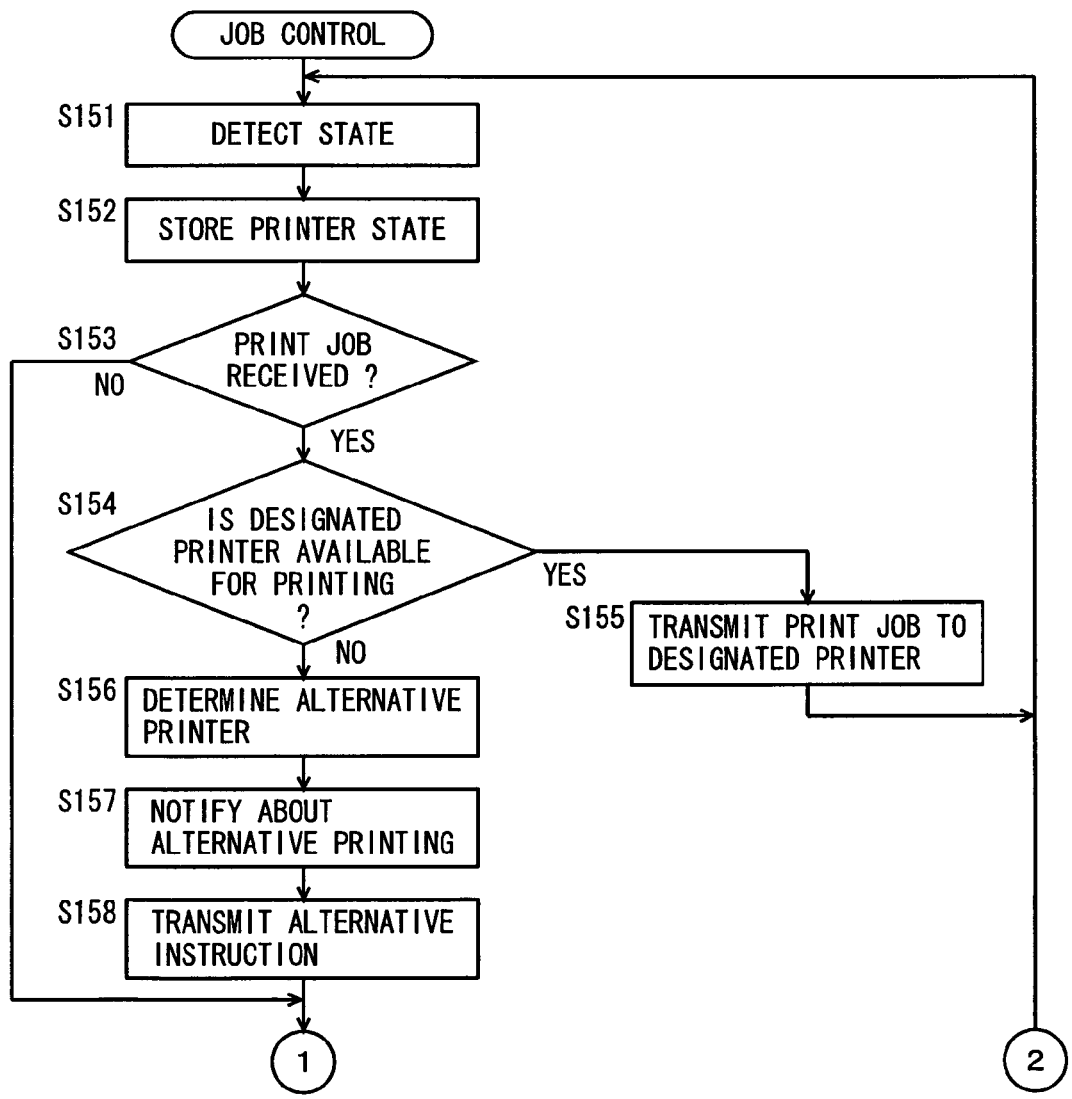
FIG. 21 is a third flowchart showing an example of the job control process.
Figure 22:
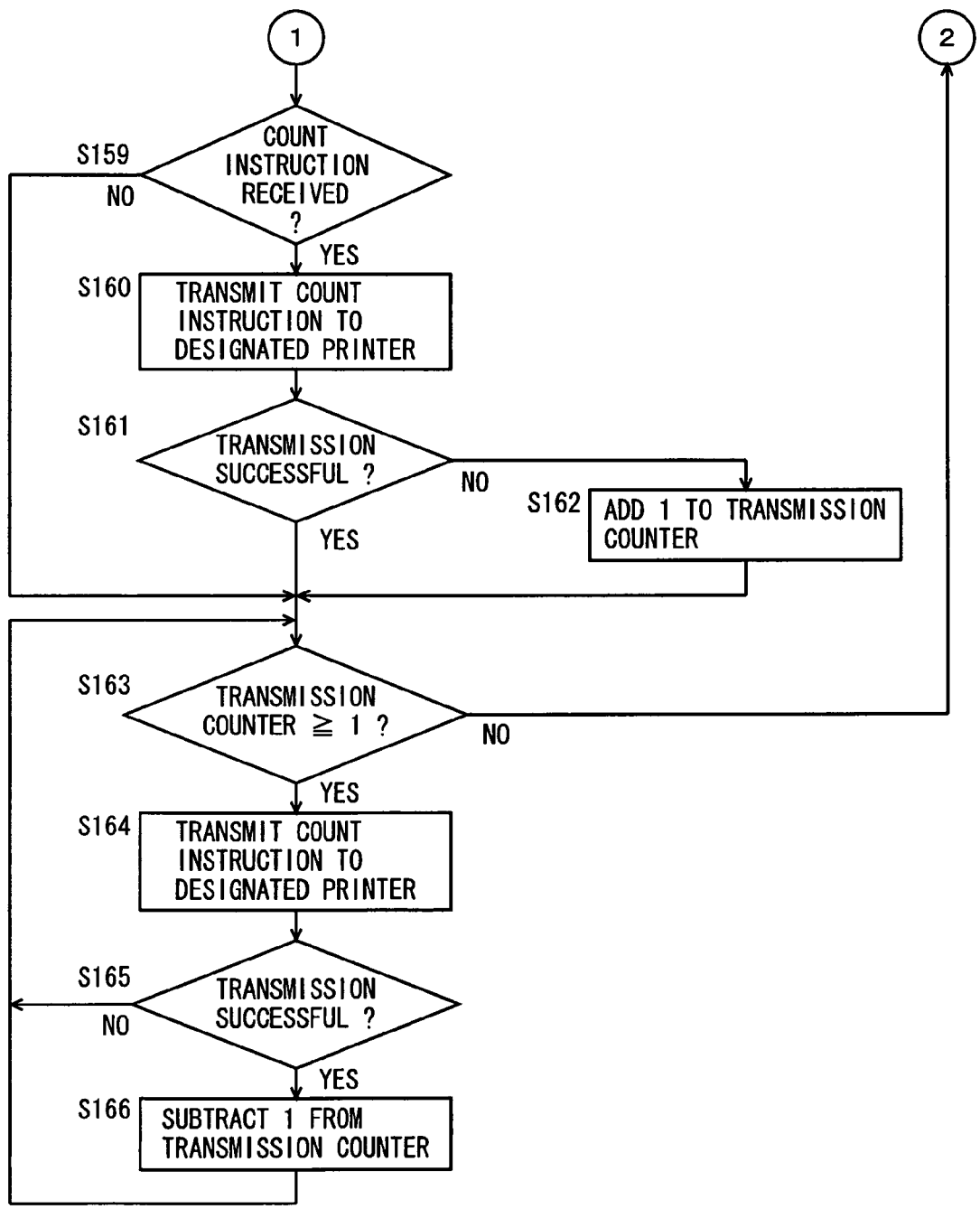
FIG. 22 is a fourth flowchart showing an example of the job control process.

FIGS. 21 and 22 are flowcharts showing examples of the flow of a job control process. The job control process is executed at CPU 201 of print server 400 by executing a program for counting the number of sheets printed. Referring to FIGS. 21 and 22, CPU 201 detects the states of the apparatuses to be controlled by print server 400 (step S151). Here CPU 201 detects the states of MFPs 100, 100A, 100B, 100C, and printer 300 by acquiring an MIB from each of the MFPs 100, 100A, 100B, 100C, and printer 300. CPU 201 then stores the detected states of MFPs 100, 100A, 100B, 100C, and printer 300 in HDD 207 (step S152).

Next, CPU 201 judges whether print server 400 receives a print job (step S153). When the print job is received, the process proceeds to step S154, and otherwise, the process proceeds to S159. In step S154, CPU 201 judges whether the designated printer designated by the print job is available for printing. The availability for printing is judged, in step S152, based on the state stored in HDD 207. When the designated printer is available for printing, the process proceeds to step S155, and when designated printer is not available for printing, the process proceeds to step S156. In step S155, CPU 201 transmits the print job to the designated printer MFP 100, and the process goes back to step S151.

In step S156, CPU 201 determines an alternative printer for the designated printer MFP 100. CPU 201 then informs PC 200, which has transmitted the print job, that alternative printing is carried out by the alternative printer (step S157). Specifically, CPU 201 transmits to PC 200 a message denoting that printing is carried out by the alternative printer 300 in place of the designated printer MFP 100. Thus, the user of PC 200 is able to know that the print job is carried out by and printed out from the alternative printer 300. Thus, the user knows that he/she needs to go to printer 300, not the designated printer MFP 100, to fetch the printed sheets, since printer 300 actually brings out the printed sheets.

In step S58, CPU 201 transmits the alternative instruction to the alternative printer 300, and the process proceeds to step S159.

In step S159, CPU 201 judges whether print server 400 receives a count instruction from the alternative printer 300. When the count instruction is received, the process proceeds to step S160, and otherwise, the process proceeds to step S163.

In step S160, CPU 201 transmits the count instruction to the designated printer MFP 100. CPU 201 then judges whether transmission of the count instruction is successful (step S161). When the transmission is successful, the process proceeds to step S163. When the transmission is not successful, the number "1" is added to a transmission counter (step S162), after which the process proceeds to step S163. The transmission counter counts the number of untransmitted count instructions resulting from unsuccessful transmission. Since the count instruction denotes that the alternative printer has printed one sheet of paper, the transmission counter denotes the number of sheets, among the number of sheets printed by the alternative printer, that is yet to be counted for calculating the charge at the designated printer.

In step S160, CPU 201 judges whether the transmission counter denotes a value of more than one. When the value is more than one, the process proceeds to step S164, and otherwise, the process goes back to step S151. In step S164, CPU 201 transmits the count instruction to the designated printer MFP 100. In step S165, CPU 201 judges whether transmission of the count instruction is successful. When the transmission is successful, the process proceeds to step S166, and when the transmission is not successful, the process goes back to step S163. In step S166, CPU 201 subtracts the number "1" from the transmission counter. This is because the transmission counter counts the number of untransmitted count instructions. The count instructions are transmitted to the designated printer until the value of the transmission counter is zero. This enables the designated printer to make count 121 a reliable value for calculating the charge.

Figure 23:
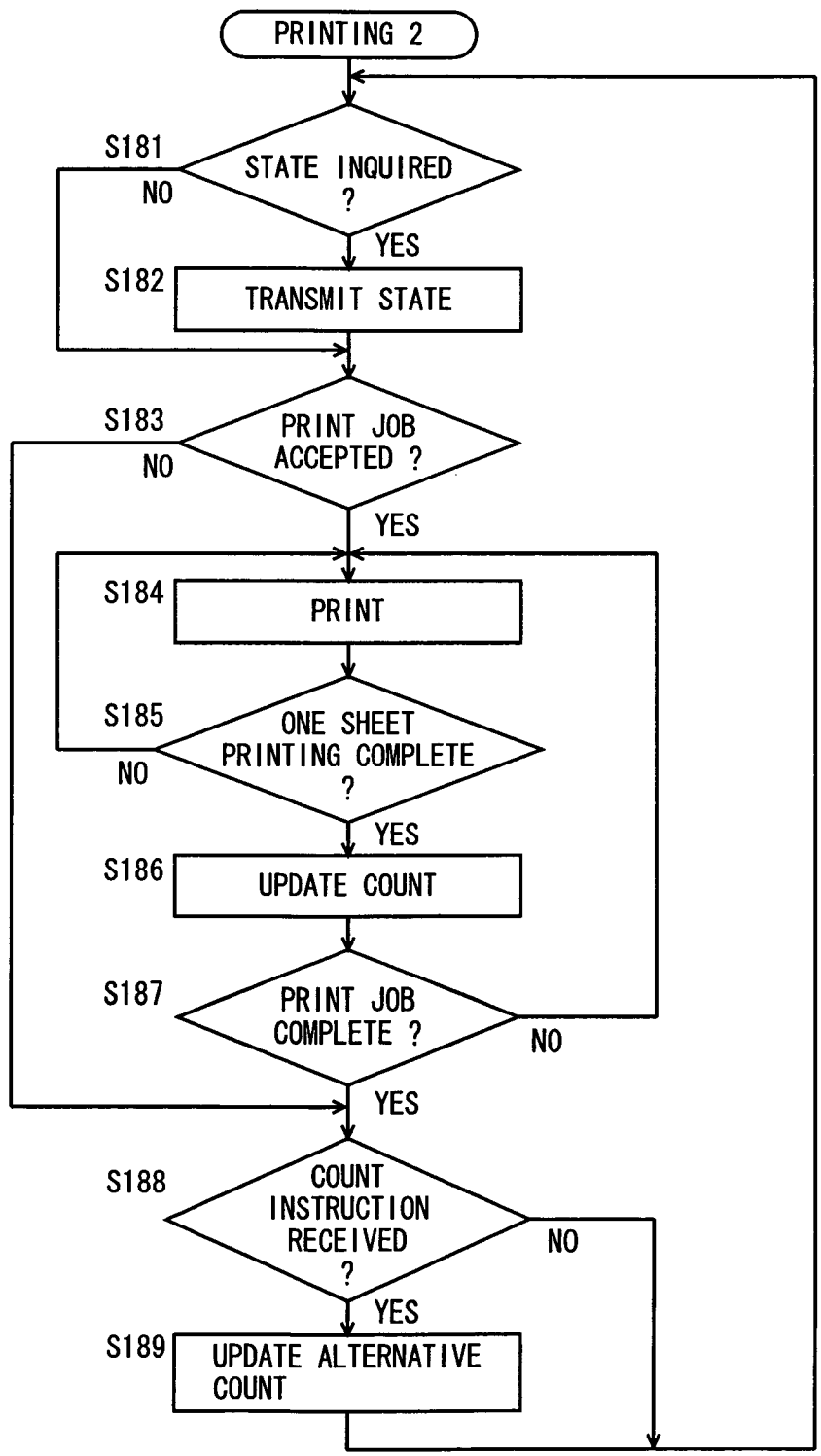
FIG. 23 is a flowchart showing an example of the flow of a print process executed by a designated printer, according to the fourth embodiment.

FIG. 23 is a flowchart showing an example of the flow of a print process executed by the designated printer according to the fourth embodiment. The print process is executed by each of MFPs 100, 100A, 100B, and 100C. Here the case where the designated printer MFP 100 executes the print process will be exemplified. The print process is executed at CPU 111 of MFP 100 by executing a program for counting the number of sheets printed.

Referring to FIG. 23, CPU 111 judges whether there is a state inquiry from print server 400 (step S181). Specifically, CPU 111 judges whether a transmission demand for an MIB is received. When there is a state inquiry, the process proceeds to step S182, and otherwise, the process proceeds to step S183. In step S182, CPU 111 transmits to print server 400 state-indicating information, which is, here, MIB.

In step S183, CPU 111 judges whether the print job is accepted from print server 400. When the print job is accepted, the process proceeds to step S184, and otherwise, the process proceeds to step S188.

In step S184, CPU 111 executes the print job. Specifically, CPU 111 carries out printing based on print data included in the print job according to print conditions. CPU 111 then judges whether printing of one sheet is complete (step S185). When printing of one sheet is not yet complete, the process goes back to step S184, and when printing of one sheet is complete, the process proceeds to step S186. When, however, a trouble occurs and printing is thereby impossible, the process proceeds to step S188. In step S186, CPU 111 updates count 121 by adding thereto the number "1", which denotes that the number of sheets printed is one. Since count 121 is updated only when printing of one sheet is complete, count 121 is not updated when printing is disabled by a trouble or the like before completion of the printing, thereby enabling it to properly count the number of sheets printed which serves as the basis on which a charge is calculated.

In step S187, CPU 111 judges whether printing of the print job is complete. Specifically, CPU 111 judges for completion of printing of all the print data included in the print job and of printing of the number of sheets specified as a print condition. When printing of the print job is complete, the process proceeds to step S188, and otherwise, the process goes back to step S184 for execution of next printing.

In step S188, CPU 111 judges whether the count instruction is received. When the count instruction is received, the process proceeds to step S189, and otherwise, the process goes back to step S181. In step S189, CPU 111 updates alternative count 125 by adding thereto the number "1", which denotes that the number of sheets printed by the alternative printer is one. Then the process goes back to step S181. Since alternative count 125 is updated only when printing of one sheet by the alternative printer is complete, alternative count 125 is not updated when printing is disabled by a trouble or the like before completion of the printing at the alternative printer, thereby enabling it to properly count the number of sheets printed which serves as the basis on which a charge is calculated.

FIG. 24 is a flowchart showing an example of a print process executed by the alternative printer, according to the fourth embodiment. The print process is executed by the alternative printer 300, against which a charge is not levied.

Referring to FIG. 24, steps S191 and S192 are the same as steps S181 and S182, respectively, shown in FIG. 23, and therefore will not be repeated here.

In step S193, CPU 301 judges whether counter 300 receives a print job. When the print job is received, the process proceeds to step S194, and otherwise, the process goes back to step S181. In step S194, CPU 301 carries out printing based on print data included in the print job according to print conditions, and the process proceeds to step S195.

In step S195, CPU 301 judges whether printing of one sheet is complete. When printing of one sheet is not yet complete, the process goes back to step S194, and the process proceeds to step S196 upon completion of printing of one sheet. When, however, a trouble occurs and printing is thereby impossible, the process goes back to step S181. In step S196, CPU transmits the count instruction to print server 400, and the process proceeds to step S197.

In step S197, CPU 301 judges whether printing of the print job is complete. Specifically, CPU 301 judges for completion of printing of all the print data included in the print job and of printing of the number of sheets specified as a print condition. When printing of the print job is complete, the process goes back to step S181, and otherwise, the process goes back to step S194 for execution of next printing.

In the fourth embodiment, MFPs 100, 100A, 100B, and 100C execute the charge calculating process shown in FIG. 17.

As has been described hereinbefore, in print system 1A according to this embodiment, when print server 400 accepts a print job from PC 200 and the designated printer MFP 100 is not available for executing the print job, then print server 400 transmits an alternative instruction including the print job to the alternative printer 300, and transmits to the designated printer MFP 100 a count instruction upon every printing of one sheet by the alternative printer 300 based on the print job included in the alternative instruction. The designated printer MFP 100, upon receipt of the print job from print server 400, carries out printing based on the print job, and updates count 121 by adding thereto the number of sheets printed. Upon receipt of the count instruction, the designated printer MFP 100 updates alternative count 125 by adding thereto the number of sheets (number of alternative sheets) printed by the alternative printer 300 based on the print job included in the alternative instruction. Thus, when the alternative printer is of the type that a charge is not levied against, the number of alternative sheets is not incorporated into calculation, thereby enabling calculation of a proper charge.

While in the above embodiments printer 300, against which a charge is not levied, is taken as an example for acting as the alternative printer for the designated printer MFP 100, a printer against which a charge is levied, such as MFP 100A, may be rendered the alternative printer. MFP 100A, which has the same basic structure as MFP 100, adds, upon receipt of the print job from the designated printer MFP 100, the number of alternative sheets to count 125, and transmits a count instruction to MFP 100. That is, whether the alternative printer is MFP 100A or printer 300, the same charge is calculated in MFP 100. In the alternative printer MFP 100A, the number of sheets printed by MFP 100A in place of MFP 100 is added to count 125, which is located in MFP 100A. Thus, a charge is levied against MFP 100A for the print job that originally designated the designated MFP 100. MFP 100A calculates a unit charge based on the addition of the number of sheets (count 125) actually printed and the number of sheets (alternative count 125) printed by the alternative printer, and calculates the charge based on the unit charge and the number of sheets (count 125) actually printed.

While in the above embodiments description has been made of print systems 1 and 1A, it will be readily appreciated that the present invention can also be taken as such a method for counting the number of sheets printed that executes the processes shown in FIGS. 15 to 17 and 21 to 24, or as such a program for counting the number of sheets printed that is embodied on a computer readable medium and causes a computer to execute the processes shown in FIGS. 15 to 17 and 21 to 24.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a job accepting portion to accept a print job;
   a printing portion to carry out printing based on the accepted print job;
   a requesting portion to, when said printing portion is not available for executing the print job, transmit an alternative instruction including the accepted print job to an alternative printer; and
   an adding portion to add the number of alternative sheets to the number of sheets printed by said printing portion, the alternative sheets being printed by said alternative printer based on the print job included in the alternative instruction,
   wherein when a unit charge for printing employed in said image forming apparatus is lower than a unit charge for printing employed in said alternative printer, said adding portion adds the number of alternative sheets to the number of sheets printed by said printing portion; and
   when the unit charge for printing employed in said image forming apparatus is not lower than the unit charge for printing employed in said alternate printer, said adding portion does not add the number of alternative sheets to the number or sheets printed by said printing portion.

2. The image forming apparatus according to claim 1, further comprising a count instruction receiving portion to receive a count instruction from said alternative printer upon every printing by said alternative printer based on the print job included in the alternative instruction,
   wherein said adding portion adds the number of alternative sheets to the number of sheets printed by said printing portion upon receipt of the count instruction.

3. The image forming apparatus according to claim 2, wherein:
   said count instruction receiving portion receives the count instruction upon every printing of a predetermined unit number of sheets by said alternative printer based on the print job included in the alternative instruction; and
   said adding portion adds the predetermined unit number of sheets to the number of sheets printed by said printing portion upon receipt of the count instruction.

4. The image forming apparatus according to claim 2, wherein:
   the count instruction received by said count instruction receiving portion includes the number of alternative sheets, the alternative sheets being printed by said alternative printer based on the print job included in the alternative instruction; and
   said adding portion adds the number of alternative sheets included in the count instruction to the number of sheets printed by said printing portion upon receipt of the count instruction.

5. An image forming apparatus comprising:
   a printing portion to, upon receipt of a print job, carry out printing based on the print job;
   a count instruction transmitting portion to, when said image forming apparatus receives from another image forming apparatus an alternative instruction including the print job, transmit a count instruction to said another image forming apparatus upon every printing based on the other print job included the alternative instruction; and
   a counting portion to, when the count instruction is not transmitted, count the number of sheets printed by said printing portion,
   wherein said count instruction transmitting portion transmits the count instruction when a unit charge for printing employed in said image forming apparatus is not lower than a unit charge for printing employed in said another image forming apparatus; and
   wherein said count instruction transmitting portion does not transmit the count instruction when the unit charge for printing employed in said image forming apparatus is lower than the unit charge for printing employed in said another image forming apparatus.

6. The image forming apparatus according to claim 5, wherein said count instruction transmitting portion transmits the count instruction upon every printing of a predetermined unit number of sheets by said printing portion based on the print job included in the alternative instruction.

7. The image forming apparatus according to claim 5, further comprising a print controlling portion to, when said another image forming apparatus provides only monochrome printing, carry out printing of the print job in monochrome.

8. The image forming apparatus according to claim 5, wherein the count instruction transmitted by said count instruction transmitting portion includes the number of alternative sheets, the alternative sheets being printed based on the print job included in the alternative instruction.

9. A print system including a print server, a first image forming apparatus, and a second image forming apparatus, said first image forming apparatus and said second image forming apparatus carrying out printing upon receipt of a print job from said print server,
   said print server comprising:
      a state detecting portion to detect a state of each of said first image forming apparatus and said second image forming apparatus;
      a job receiving portion to receive the print job;
      a state judging portion to, when the received print job designates said first image forming apparatus, judge whether said first image forming apparatus is available for printing;
      a first instructing portion to, when said state judging portion judges that said first image forming apparatus is available for printing, transmit the print job to said first image forming apparatus;
      a second instructing portion to, when said state judging portion judges that said first image forming apparatus is not available for printing, transmit an alternative instruction including the print job to said second image forming apparatus; and
      a third instructing portion to transmit a count instruction to said first image forming apparatus when a unit charge for printing employed in said first image forming apparatus is lower than a unit charge for printing employed in said second image forming apparatus,
   said first image forming apparatus comprising:
      a first printing portion to carry out printing based on the print job upon receipt of the print job from said print server; and an adding portion to, upon receipt of the count instruction from the third instructing portion, add the number of alternative sheets to the number of sheets printed by said first printing portion, the alternative sheets being printed by said second image forming apparatus based on the print job included in the alternative instruction.

10. The print system according to claim 9, wherein said third instructing portion transmits the count instruction to said first image forming apparatus upon every printing of a predetermined unit number of sheets by said second image forming apparatus based on the print job included in the alternative instruction.

11. The print system according to claim 9, wherein:
the count instruction transmitted by said third instructing portion includes the number of alternative sheets, the alternative sheets being printed by said second image forming apparatus based on the print job included in the alternative instruction; and
upon receipt of the count instruction, said adding portion adds the number of alternative sheets included in the count instruction to the number of sheets printed by said first printing portion.

12. The print system according to claim 9, wherein when said first image forming apparatus provides only monochrome printing, the alternative instruction transmitted by said second instructing portion to said second image forming apparatus includes an instruction for monochrome printing.

13. A print system including a print server, a first image forming apparatus, and a second image forming apparatus, said first image forming apparatus and said second image forming apparatus carrying out printing upon receipt of a print job from said print server,
said print server comprising:
a state detecting portion to detect a state of each of said first image forming apparatus and said second image forming apparatus;
a job receiving portion to receive the print job;
a state judging portion to, when the received print job designates said first image forming apparatus, judge whether said first image forming apparatus is available for printing;
a first instructing portion to, when said state judging portion judges that said first image forming apparatus is available for printing, transmit the print job to said first image forming apparatus; and
a second instructing portion to, when said state judging portion judges that said first image forming apparatus is not available for printing, transmit an alternative instruction including the print job to said second image forming apparatus,
said first image forming apparatus comprising:
a first printing portion to carry out printing based on the print job upon receipt of the print job from said print server; and
an adding portion to add the number of alternative sheets to the number of sheets printed by said first printing portion, the alternative sheets being printed by said second image forming apparatus based on the print job included in the alternative instruction,
said second image forming apparatus comprising:
a second printing portion to carry out printing based on the print job upon receipt of the print job from said print server;
a count instruction transmitting portion to, when said second image forming apparatus receives the alternative instruction from said print server, transmit a count instruction to said print server upon every printing based on the print job included in the alternative instruction; and
a counting portion to, when the count instruction is not transmitted, count the number of sheets printed by said second printing portion,
wherein when a unit charge for printing employed in said first image forming apparatus is lower than a unit charge for printing employed in said second image forming apparatus, the alternative instruction transmitted by said second instruction portion to said second image forming apparatus does not include a command for counting of the number of sheets printed by said second printing portion;
when the unit charge of said first image forming apparatus is not lower than the unit charge of said second image forming apparatus, said second instruction portion transmits the alternative instruction to said second image forming apparatus, the alternative instruction including a command of instruction for counting of the number of sheets printed by said second printing portion;
when the unit charge of said first image forming apparatus is lower than the unit charge of said second image forming apparatus, said count instruction transmitting portion transmits the count instruction to said print server; and
when the unit charge of said first image forming apparatus is not lower than the unit charge of said second image forming apparatus, said count instruction transmitting portion does not transmit the count instruction to said print server.

14. The print system according to claim 13, wherein said count instruction transmitting portion transmits the count instruction upon every printing of a predetermined unit number of sheets by said second image forming apparatus based on the print job included in the alternative instruction.

15. A method for counting the number of sheets printed, the method comprising steps of:
accepting a print job at an image forming apparatus;
carrying out printing based on the print job;
transmitting an alternative instruction including the accepted print job to an alternative printer when the accepted print job is not executable in the printing step; and
when a unit charge for printing employed in said image forming apparatus is lower than a unit charge for printing employed in said alternative printer, adding the number of alternative sheets to the number of sheets printed in the printing step, the alternative sheets being printed by said alternative printer based on the print job included in the alternative instruction, and when the unit charge for printing employed in said image forming apparatus is not lower than the unit charge for printing employed in said alternative printer, the number of alternative sheets is not added to the number of sheets printed in the printing step.

16. A method for counting the number of sheets printed, the method comprising steps of:
receiving a print job at an image forming apparatus and carrying out printing based on the print job upon receipt of the print job;
receiving from another image forming apparatus an alternative instruction including a print job and, when a unit charge for printing employed in said image forming apparatus is not lower than a unit charge for printing employed in said another image forming apparatus, transmitting a count instruction to said another image forming apparatus upon every printing based on the print job included the alternative instruction; and counting the number of sheets printed in the printing step when the count instruction is not transmitted, wherein when the unit charge for printing employed in said image forming apparatus is lower than the unit charge for printing employed in said another image forming apparatus, the count instruction is not transmitted to said another image forming apparatus.

17. A program for counting the number of sheets printed, the program being embodied on a non-transitory computer readable medium, the program causing a computer to execute steps comprising:

accepting a print job at an image forming apparatus;

carrying out printing based on the print job;

transmitting an alternative instruction including the accepted print job to an alternative printer when the accepted print job is not executable in the printing step; and when a unit charge for printing employed in said image forming apparatus is lower than a unit charge for printing employed in said alternative printer, adding the number of alternative sheets to the number of sheets printed in the printing step, the alternative sheets being printed by said alternative printer based on the print job included in the alternative instruction, and when the unit charge for printing employed in said image forming apparatus is not lower than the unit charge for printing employed in said alternative printer, the number of alternative sheets is not added to the number of sheets printed in the printing step.

18. A program for counting the number of sheets printed, the program being embodied on a non-transitory computer readable medium, the program causing a computer to execute steps comprising:

receiving a print job at an image forming apparatus and carrying out printing based on the print job upon receipt of the print job;

receiving from another image forming apparatus an alternative instruction including a print job and, when a unit charge for printing employed in said image forming apparatus is not lower than a unit charge for printing employed in said another image forming apparatus, transmitting a count instruction to said another image forming apparatus upon every printing based on the print job included the alternative instruction; and counting the number of sheets printed in the printing step when the count instruction is not transmitted, wherein when the unit charge for printing employed in said image forming apparatus is lower than the unit charge for printing employed in said another image forming apparatus, the count instruction is not transmitted to said another image forming apparatus.

* * * * *